US008844426B2

(12) United States Patent
Ochoa et al.

(10) Patent No.: US 8,844,426 B2
(45) Date of Patent: Sep. 30, 2014

(54) BEVERAGE MIXING SYSTEM AND PROCESS

(71) Applicant: Güdpod Holdings, LLC, Bronxville, NY (US)

(72) Inventors: Gian-Carlo Ochoa, Bronxville, NY (US); Brendan Duffy, Sandy Hook, CT (US); Gary Van Deursen, Essex, CT (US)

(73) Assignee: Gudpod Holdings, LLC, Bronxville, NY (US)

( * ) Notice: Subject to any disclaimer, the term of this patent is extended or adjusted under 35 U.S.C. 154(b) by 0 days.

(21) Appl. No.: 14/188,101

(22) Filed: Feb. 24, 2014

(65) Prior Publication Data

US 2014/0165846 A1    Jun. 19, 2014

Related U.S. Application Data

(62) Division of application No. PCT/US2013/027982, filed on Feb. 27, 2013.

(60) Provisional application No. 61/666,835, filed on Jun. 30, 2012, provisional application No. 61/604,410, filed on Feb. 28, 2012.

(51) Int. Cl.
*A47J 31/06* (2006.01)
*A47J 31/40* (2006.01)
*A47J 31/44* (2006.01)

(52) U.S. Cl.
CPC ............ *A47J 31/4492* (2013.01); *A41J 31/407* (2013.01)
USPC ............... 99/287; 99/295; 99/323.3; 206/220

(58) Field of Classification Search
USPC .......... 99/323.3, 287, 323, 348, 295; 206/0.5, 206/220, 221, 222, 219; 366/247, 243, 281
See application file for complete search history.

(56) References Cited

U.S. PATENT DOCUMENTS

| | | | | |
|---|---|---|---|---|
| 3,134,577 | A * | 5/1964 | Bollmeier | 206/222 |
| 4,160,602 | A * | 7/1979 | Benz et al. | 366/162.1 |
| 4,408,690 | A * | 10/1983 | Ferrero | 206/222 |
| 6,647,863 | B2 * | 11/2003 | Lang | 99/287 |
| 6,706,300 | B1 | 3/2004 | Lassota | |
| 2005/0193896 | A1 * | 9/2005 | McGill | 99/348 |
| 2009/0065570 | A1 | 3/2009 | Peters et al. | |
| 2009/0293735 | A1 | 12/2009 | Van Dillen et al. | |
| 2010/0154645 | A1 | 6/2010 | Nosler et al. | |
| 2012/0121768 | A1 | 5/2012 | Lai et al. | |

OTHER PUBLICATIONS

International Search Report corresponding to co-pending International Patent Application Serial No. PCT/US2013/027982, Russian Patent Office, dated Jul. 11, 2013; (2 pages).

* cited by examiner

*Primary Examiner* — Reginald L Alexander
(74) *Attorney, Agent, or Firm* — Nixon Peabody LLP

(57) ABSTRACT

The present invention relates to a system and process for a nutraceutical beverage mixing system. Provided is a customizable supplement beverage system and method for personalizing and operating the same to a particular user and optionally for operative tracking. Proposed additionally is an operative system for receiving and individually identifying a concentrate or supplement combinations, for mixing the same prior to a use, and for dispensing the same for use, and for tracking control factors relating to the same.

21 Claims, 21 Drawing Sheets

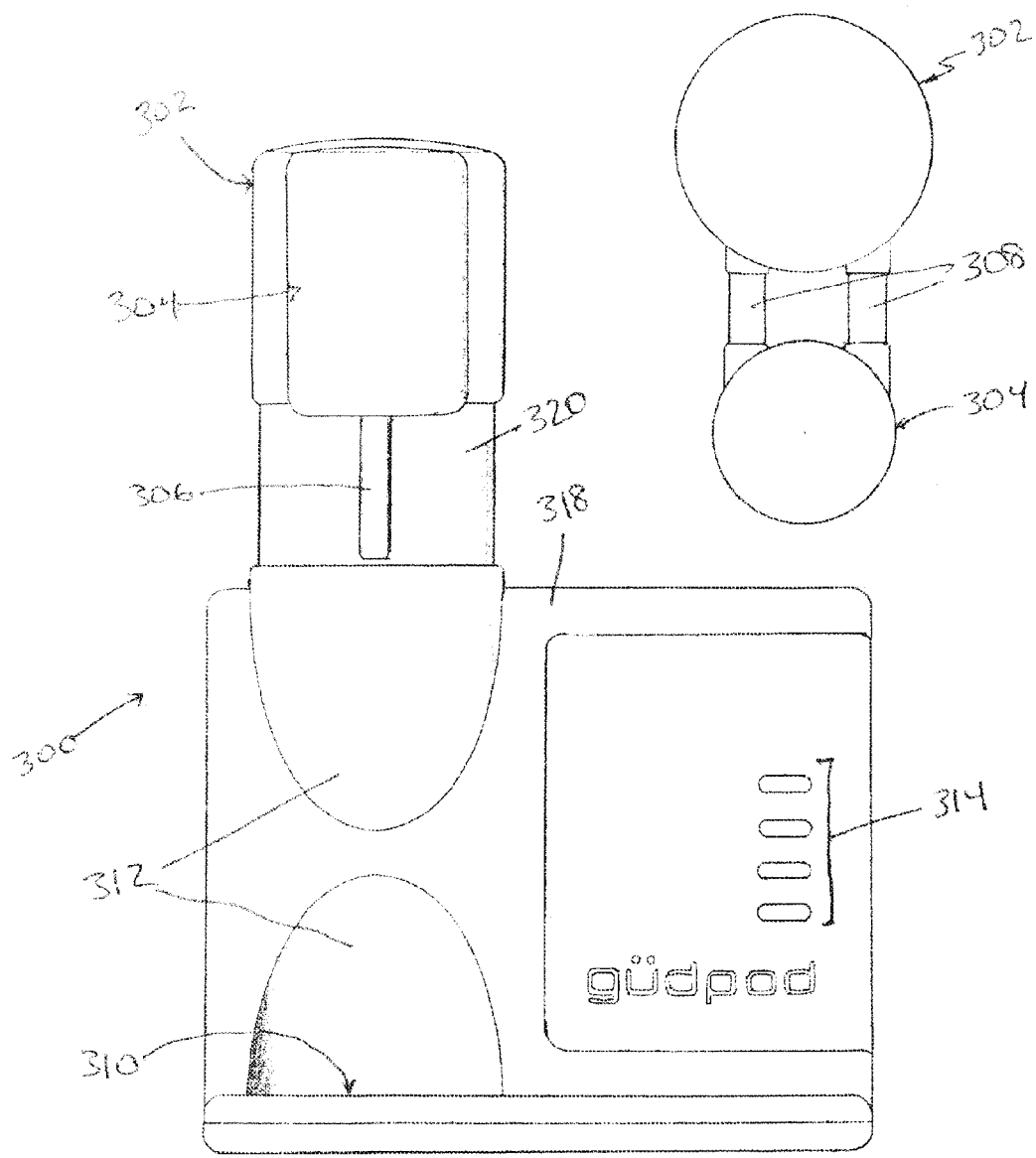

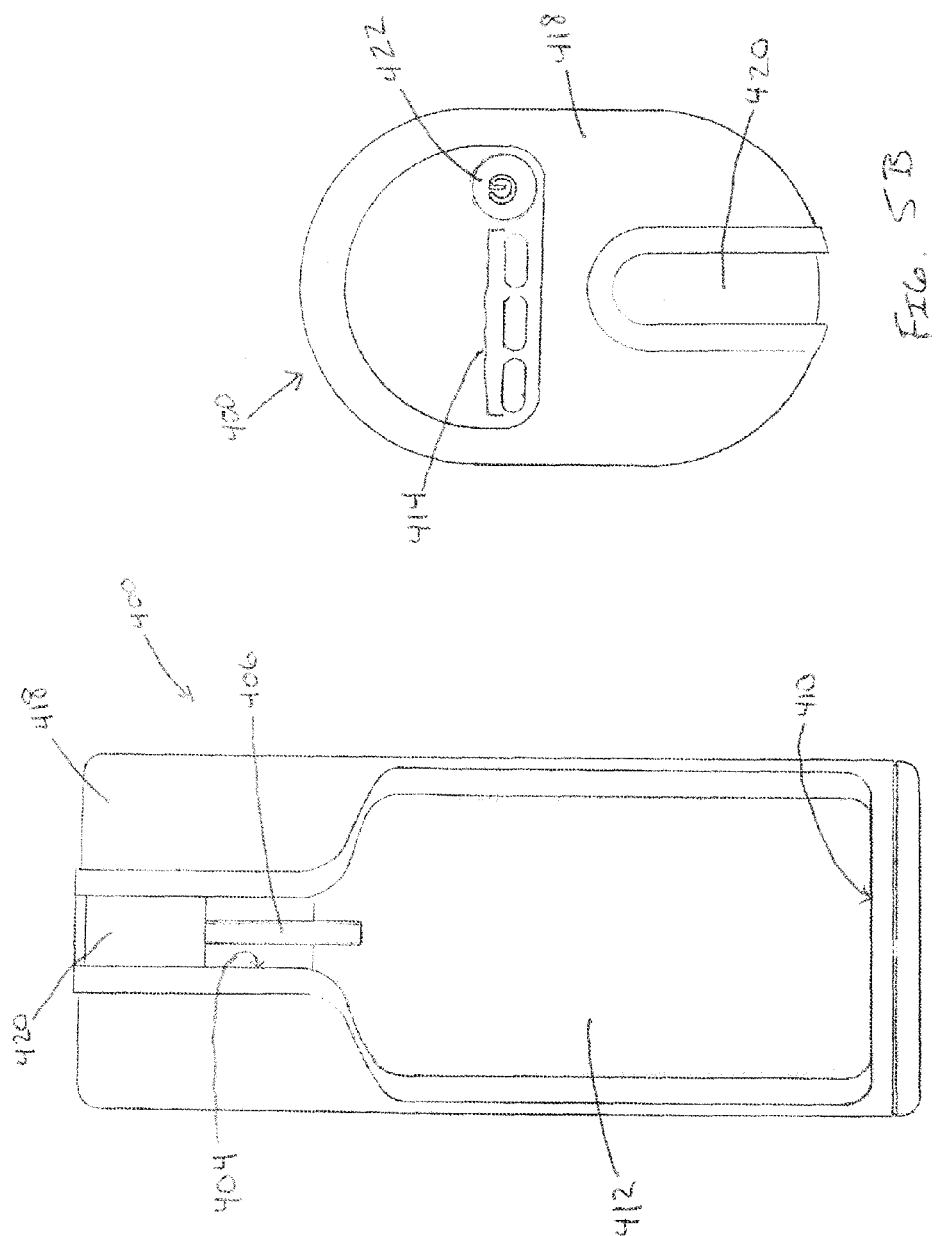

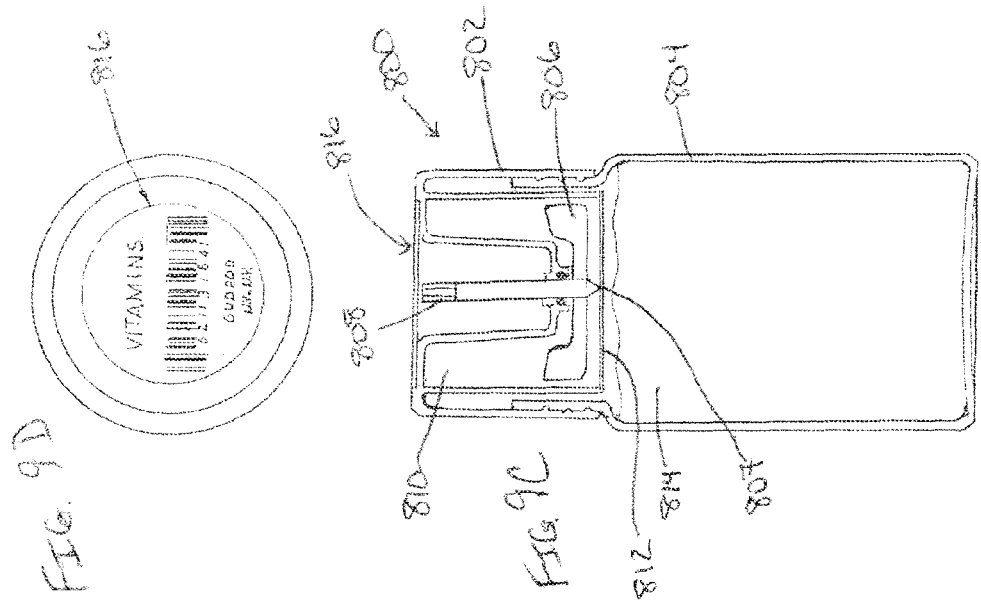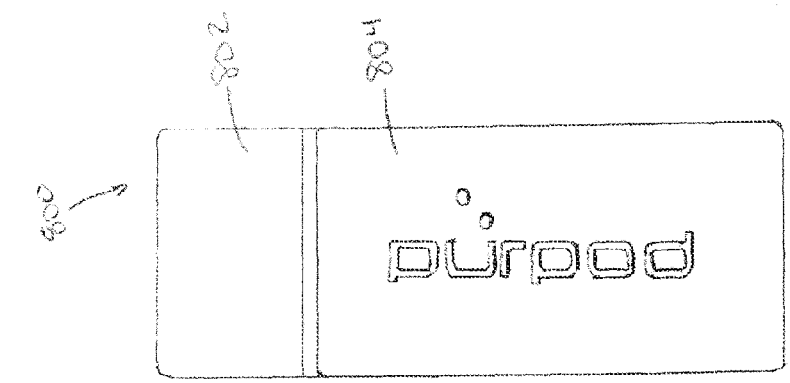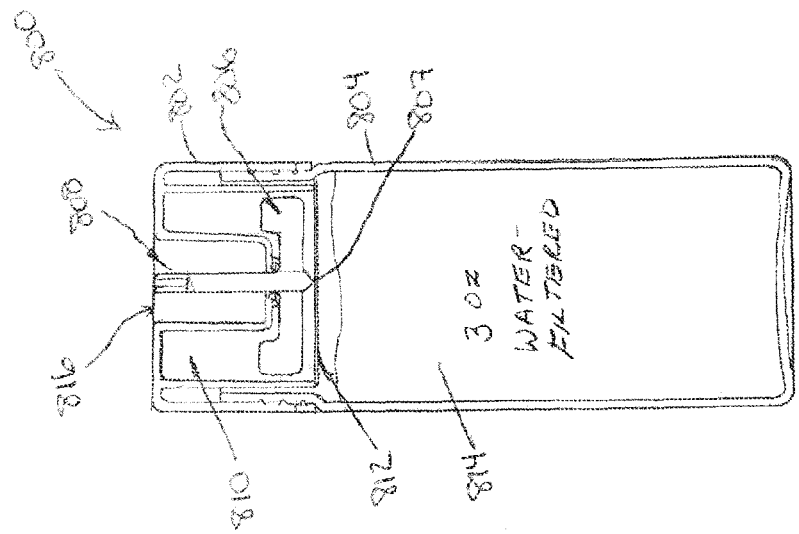

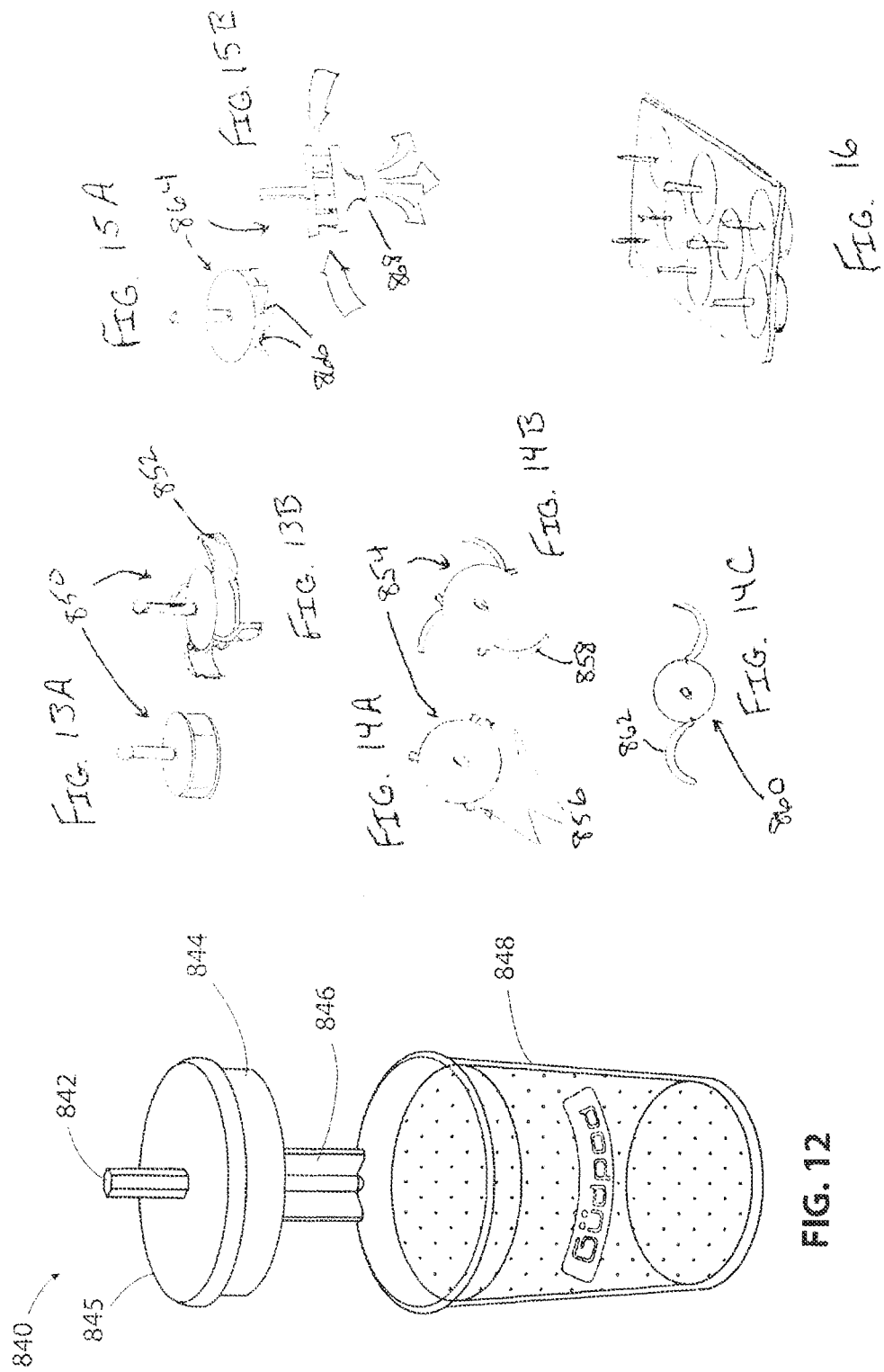

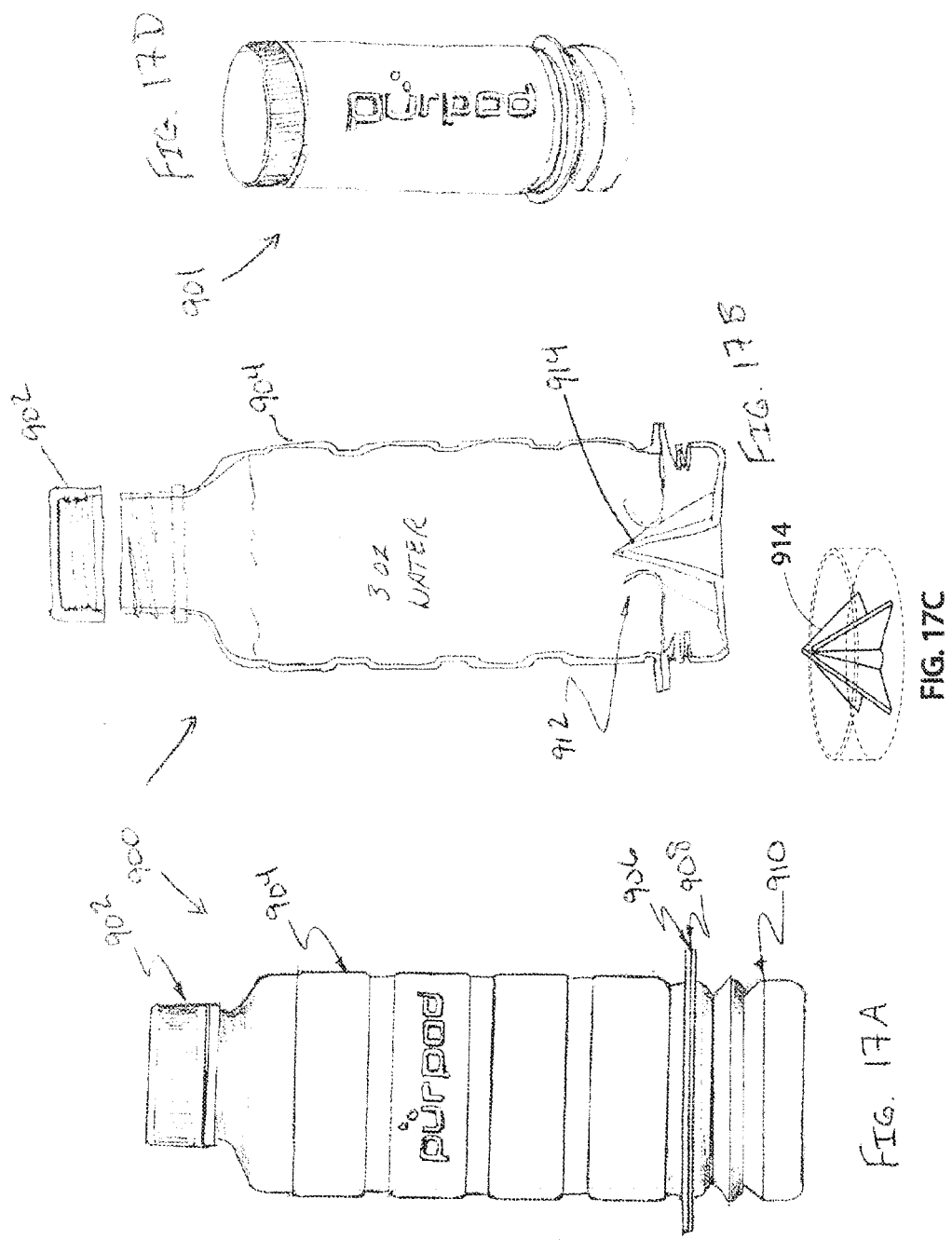

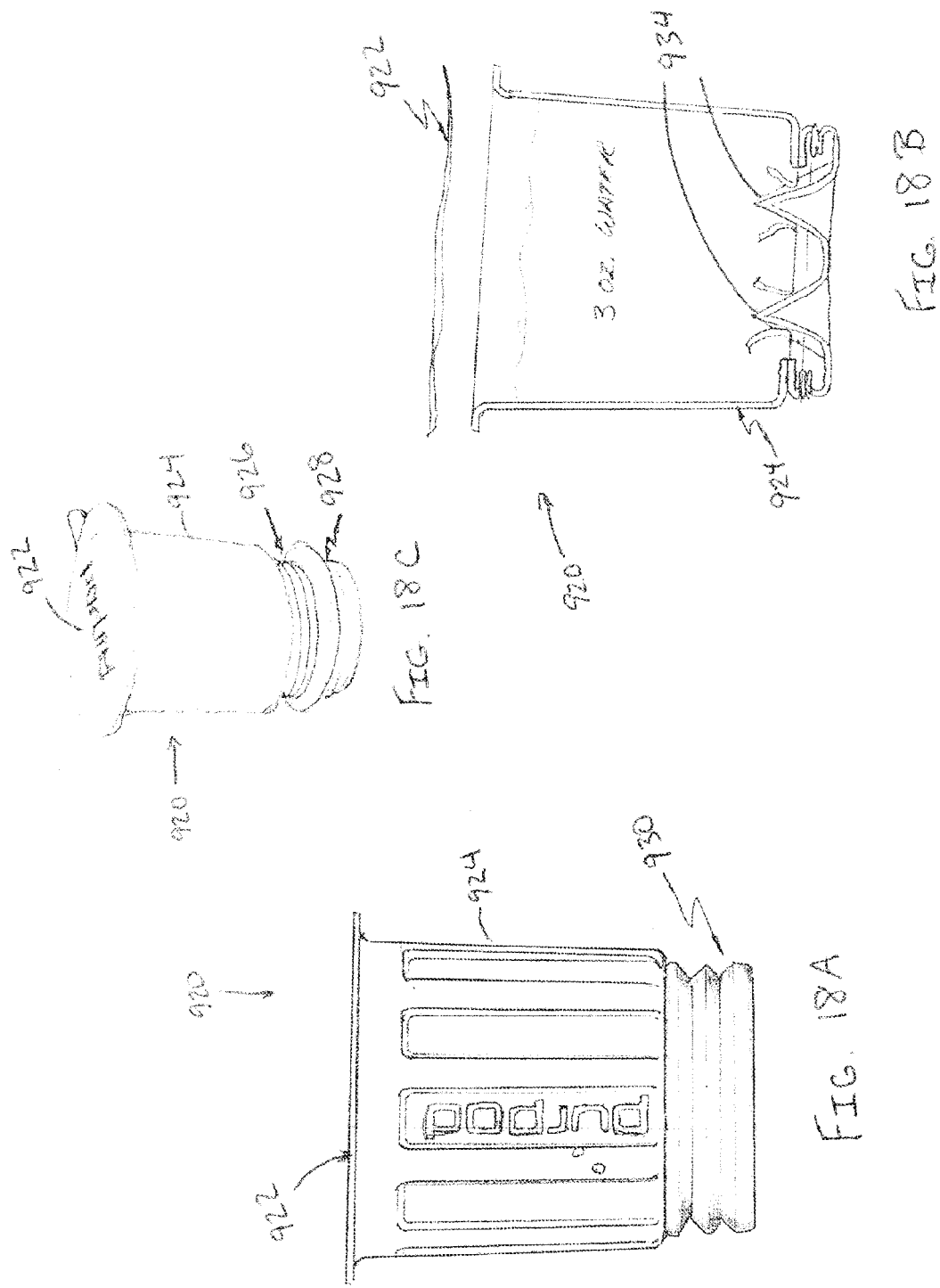

BEVERAGE MIXING SYSTEM AND PROCESS

CROSS-REFERENCE TO RELATED APPLICATIONS

This application is a divisional of International Application No. PCT/US2013/027982, filed Feb. 27, 2013, which claims the benefit of U.S. Provisional Application No. 61/666,835, entitled "A Beverage Mixing System and Process," filed on Jun. 30, 2012, and of U.S. Provisional Application No. 61/604,410, entitled "A Trainable Nutraceutical Beverage System and Method of Operating the Same," filed on Feb. 28, 2012, all of which are incorporated by reference herein in their entireties.

BACKGROUND OF THE INVENTION

1. Field of the Invention

The present invention relates to a trainable nutraceutical beverage mixing system and method for operating the same. More particularly, the present invention relates to a customizable supplement beverage system, and method for personalizing the same to a particular user and for tracking of the same. The invention also relates to multi-compartment pods or containers for use with the trainable beverage mixing system.

2. Description of the Related Art

Industrial applications of trainable computer systems are known in the art, and typically include user-preference memorization. Also known are customized nutritional food and beverage dispensing systems, such as the one in U.S. Pat. No. 7,762,181 (Boland et al.), the entire contents of which are incorporated by reference.

As discussed in detail in Boland '181 a highly complex ingredient processor blends, cooks and prepares in an individual dose system requiring continuous update and complex operational steps. Unfortunately, this reference processor blends, cooks and prepares in an individual dose system requiring continuous update and complex operational steps. Unfortunately, this reference fails to identify the trainable operation desired of the present invention, system and method. Also detriment to '181 is a substantially high cost requirement for a dispensing system which prohibits individual-use systems.

Accordingly, there is a need for an improved trainable nutraceutical beverage mixing system and method of operating the same. Further, there is also a need to improve process efficiencies in tracking, identifying, dispensing and monitoring individually customizable supplement programs matched with a user's needs. There is also a need for portable beverage mixing system including multi-component containers for use therewith.

ASPECTS AND SUMMARY OF THE INVENTION

In response, the present invention provides a trainable nutraceutical beverage system. Provided is a customizable supplement beverage system, and method for personalizing and operating the same to a particular user and for operative tracking. Proposed additionally is an operative system for receiving and individually identifying a concentrate or supplement combinations, for mixing the same prior to a use, and for dispensing the same for use, and for tracking control factors relating to the same. Also proposed is a personalized supplement program that is beverage based for user convenience.

Also proposed are various portable mixing systems with safety controls according to the preferred embodiment of the present invention with the system. Preferably, the systems comprise a housing body having a pod or container receiving portion with a slip resistant bottom surface. Alternatively, bottom surface may be a type of key-in surface to lock or otherwise secure the pod or container in place during operation. The preferred pods or containers for use with the invention will be discussed in greater detail below. Optionally, the mixing system may have safety controls to alert the user to a particular speed or frequency of the mixing based upon the type of nutraceutical being used or the size or amount being used. A user access code, fingerprint scan, retina scan or other known type of safety control mechanisms that are difficult to bypass, including software safety control, may be employed with the system, especially for the consumption of quantity-sensitive materials (i.e., Iron, etc.) to prevent accidental overdose. The mixing system further comprises a movable mixing head comprising a back head movably connected to a front mixing head which includes a stirrer or mixer.

During operation, after the pod or container is positioned securely on the surface, the mixing head is lowered such that the mixer or stirrer is engaged with an upper component of the pod or container. The user then selects the appropriate control for the desired frequency or speed of the mixing. Optionally, the front mixing head, which is connected to the back head via one or more movable arms such that the mixing arm moves about within the pod or container. Similarly, the mixing head may also optionally partially rotate (e.g., approximately 45%, 60%, 75%, etc.) again to move the mixing arm around within container or pod. Optionally, the mixing or agitation may additionally involve varying the depth of the engagement between the mixing paddle and the beverage, varying the duration of the mixing or agitation, reversing and/or oscillating the direction of the mixing (i.e., clockwise, counterclockwise, clockwise, etc.), and/or oscillating the depth of the engagement between the mixing paddle and the beverage (i.e., up, down, up, down, etc.).

Preferably, internal (not shown) to the mixing system is an internal process controller unit (including suitable memory and processing units) optionally linked with an external communication control system. As will be understood by those of skill in the system operational arts, during any use, system may be able to track individual uses, dispensements, particular mixing proportions, total supplement delivery and other operations. Additionally, in an optional embodiment, the communication control system may be able to communicate externally to process control system and data tables and with the delivery supply system, thereby permitting comprehensive benefit, use, and adaptation tracking for a user's health benefit. Additionally, the system may be able to re-order, and operate commercial transactions on behalf of a user based upon designated user preferences.

Also proposed are various embodiments for two compartment mixing pods or containers and some of their components that may be employed with the various mixing systems discussed above. For example, a first embodiment of a pod or container for use with the mixing systems previously described, illustrates a two part pod, a nutritional supplement part and a housing part for containing filtered water, with a mixing paddle having radially projecting blades or fans and a upwardly projecting stem for interfacing with the disclosed mixing systems. Preferably, an upper part of the pod has a sealing cap having a sealing membrane or protective label there on. Optionally, a protective label may contain a 2D or 3D barcode thereon for the mixing system to read, store and/or transmit information about the product being used.

Also optionally, a lid or cap is secured onto an upper portion of the housing part in a tamper resistant manner such that if the seal is broken the average user would notice.

Preferably, the pod or portion pack is made substantially of recyclable materials. Also, the multiple parts of the pod or pack are preferably embodied as an assembly all of which are molded of the same material (e.g., polyethylene, etc.) which can be disposed of and recycled as an assembly. This is advantageous because it simplifies the waste stream through eliminating the identification and separation of unlike materials.

During operation, once the pod or container is positioned securely into the mixing system, a mixing head will lower the mixing arm or stirrer down onto the upper portion or protective label of the pod or container. The mixing system will continue to move mixing arm downward until the lower end of the mixing arm connects or otherwise engages with the upper end of a stem of the paddle such that when the mixing arm spins, the paddle will rotate at the same speed and/or frequency. The mixing arm continues to apply downward pressure on the stem until a lower tip of the paddle punctures the sealing membrane which had been maintaining the nutritional supplement or vitamin away from the water. Once the sealing membrane is punctured the nutritional supplement or vitamin spills into the water and the mixing arm continues to apply downward pressure on the stem until the paddle is sufficiently submerged to a distance within the water to adequately and completely mix the water and nutritional supplement as described above with respect to any of the mixing systems disclosed herein. Once sufficiently mixed, the mixing arm rises out from within the container so that the container may be removed from the mixing system. Optionally, the mixing arm and/or stem may comprise a mechanism or may be configured in such a way that they become securely engaged and that when the mixing arm is removed from container, it removes the paddle as well. Optionally, the paddle may remain within the container and be disposed of along with the container once all of the liquid mixture is gone.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which:

FIG. 3A is a front plan view of the portable mixing system with safety controls according to the preferred embodiment of the present invention with the system in the raised or open position;

FIG. 3B is a top plan view of the mixing system shown in FIG. 3A;

FIG. 5A is a front plan view of the portable mixing system with safety controls according to an alternate embodiment of the present invention;

FIG. 5B is a top plan view of the mixing system shown in FIG. 5A;

FIG. 9A is a closed front plan view of the preferred embodiment for a two part pod with a mixing paddle therein for use with the mixing system according to the invention;

FIG. 9B is an exposed cross-sectional view of the two part pod shown in FIG. 9A further showing the mixing paddle;

FIG. 9C is an exposed cross-sectional view of the two part pod shown in FIG. 9A further showing the mixing paddle;

FIG. 9D is a top plan view of the cap or lid for use with the two part pod shown in FIGS. 9A-C;

FIG. 12 is an exploded perspective view of an alternative embodiment for a two part spin pod for use with the mixing system in accordance with the invention;

FIG. 13A is a perspective view of a first embodiment for a stir pod spinning mechanism in the closed position for use in mixing the contents of the spin pod during operation of the mixing system;

FIG. 13B is a perspective view of the stir pod spinning mechanism shown in FIG. 13A but shown in the open position;

FIG. 14A is a perspective view of a second embodiment for a stir pod spinning mechanism in the closed position having three blades for use in mixing the contents of the spin pod during operation of the mixing system;

FIG. 14B is a perspective view of the stir pod spinning mechanism shown in FIG. 14A but shown in the open position;

FIG. 14C is a perspective view of the stir pod spinning mechanism shown in FIG. 14A but shown in the open position and having only two stirring blades;

FIG. 15A is a perspective view of a third embodiment for a stir pod spinning mechanism for use in mixing the contents of the spin pod during operation of the mixing system;

FIG. 15B is a perspective view of the stir pod spinning mechanism shown in FIG. 15A further indicating the flow of liquid during spinning in order to mix the contents of the spin pod;

FIG. 16 is a perspective view of one embodiment of how the stir pods may be packaged for proper sealing and safety;

FIG. 17A is a front plan view of yet another alternative embodiment for a two part pod for use with the mixing system in accordance with the invention;

FIG. 17B is an exposed cross-sectional view of the two part pod shown in FIG. 17A further showing the membrane piercing component upon compression of the two part pod;

FIG. 17C is a perspective view of one embodiment of the membrane piercing component for use with the invention;

FIG. 17D is a perspective view of an alternate embodiment of the two part pod shown in

FIGS. 17A-B;

FIG. 18A is a front plan view of yet another alternative embodiment for a two part pod for use with the mixing system in accordance with the invention;

FIG. 18B is an exposed cross-sectional view of the two part pod shown in FIG. 18A further showing multiple membrane piercing component upon compression of the two part pod;

FIG. 18C is a perspective view of an alternate embodiment of the two part pod shown in FIGS. 18A-B;

DETAILED DESCRIPTION OF THE PREFERRED EMBODIMENTS

Figure 1:
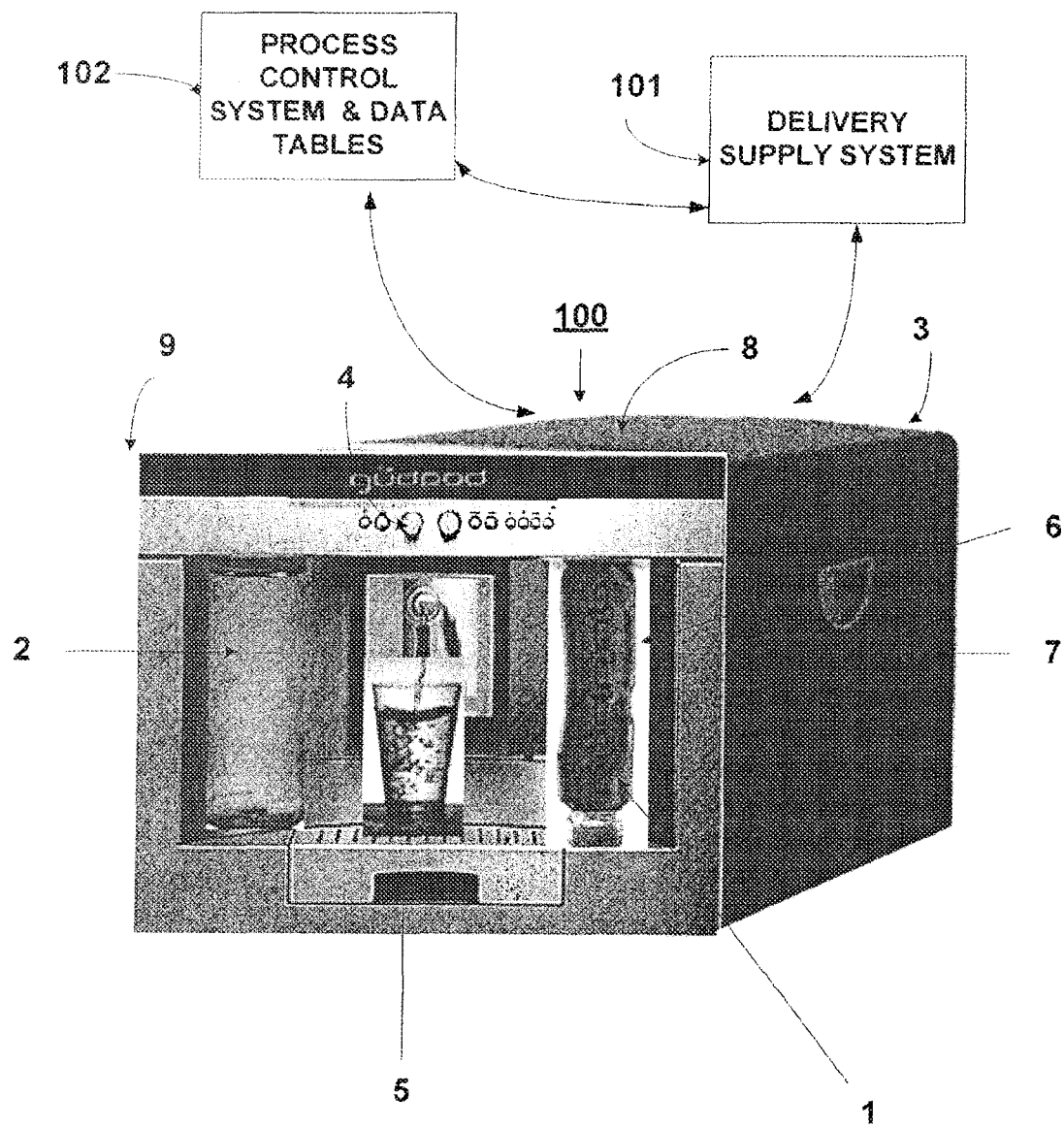
FIG. 1 is a descriptive illustration of one alternative embodiment of the proposed system.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Referring now to FIG. 1, the proposed system 100 includes an operable process control system and operable data tables 102 that is in communication with a delivery and supply system 101 for management of system 100 as will be discussed. As will be understood from the exemplary illustration an optional data communication loop is provided by illustrated arrows, but this will be understood by those of skill in the art to be operable over any known telecommunication process for receipt, manipulation, and delivery of information, and for tracking physical delivery of later described items.

Within system 100 there is provided a user-unit operable for receipt of a concentrate or supplement container 1 and a supply of a dilutant (e.g., water, coffee, tea, milk, carbonated beverages, any hot or cold fluid, or any other suitable fluid) 2, with operable power input access 3 (at rear of unit) and a control system 4 containing suitable controls for achieving the goals of the proposed system (including but not limited to on/off, volume control, temp, control, mixing proportions, optional weight-stage for dispensing tracking etc.). Both container 1 and dilutant 2 may be in multi-use, continuous, or single-use sizes.

Additionally noted s a dispensing station unit 5 for supporting a volume to receive a mixture of dilutant 1 and concentrate 2 under mixing conditions controlled by control system 4. An individual tracking identification or bar code 6 is provided on each concentrate/supplement container 1 and there is positioned an associated reader 7 for receiving identification/use information from code 6 during an installation and use of container 1. Internal (not shown) to the location unit is an internal process controller unit 8 (including suitable memory and processing units) linked with an optional external communication control system 9. As will be understood by those of skill in the system operational arts, during any use, system 100 will be able to track individual uses, dispensments, particular mixing proportions, total supplement delivery and other operations. Additionally, in an optional embodiment, the end unit and communication control system 9 will be able to communicate externally to process control system and data tables 102 and with delivery supply system 101, thereby permitting comprehensive benefit, use, and adaptation tracking for a user's health benefit. Additionally, system 100 will be able to optionally re-order, and operate commercial transactions on behalf of a user based upon designated user preferences.

Regarding process control system and data tables 102, it will be understood that these include a comprehensive process control units to receive, track, organize, and select from informational data bases involving comprehensive user identifications, complete medical and query information and user goals, a complete selection with all parameters of dilutants and also all supplements, minerals, pharmaceuticals etc. that may be selected based upon user-parameters.

Figure 2:
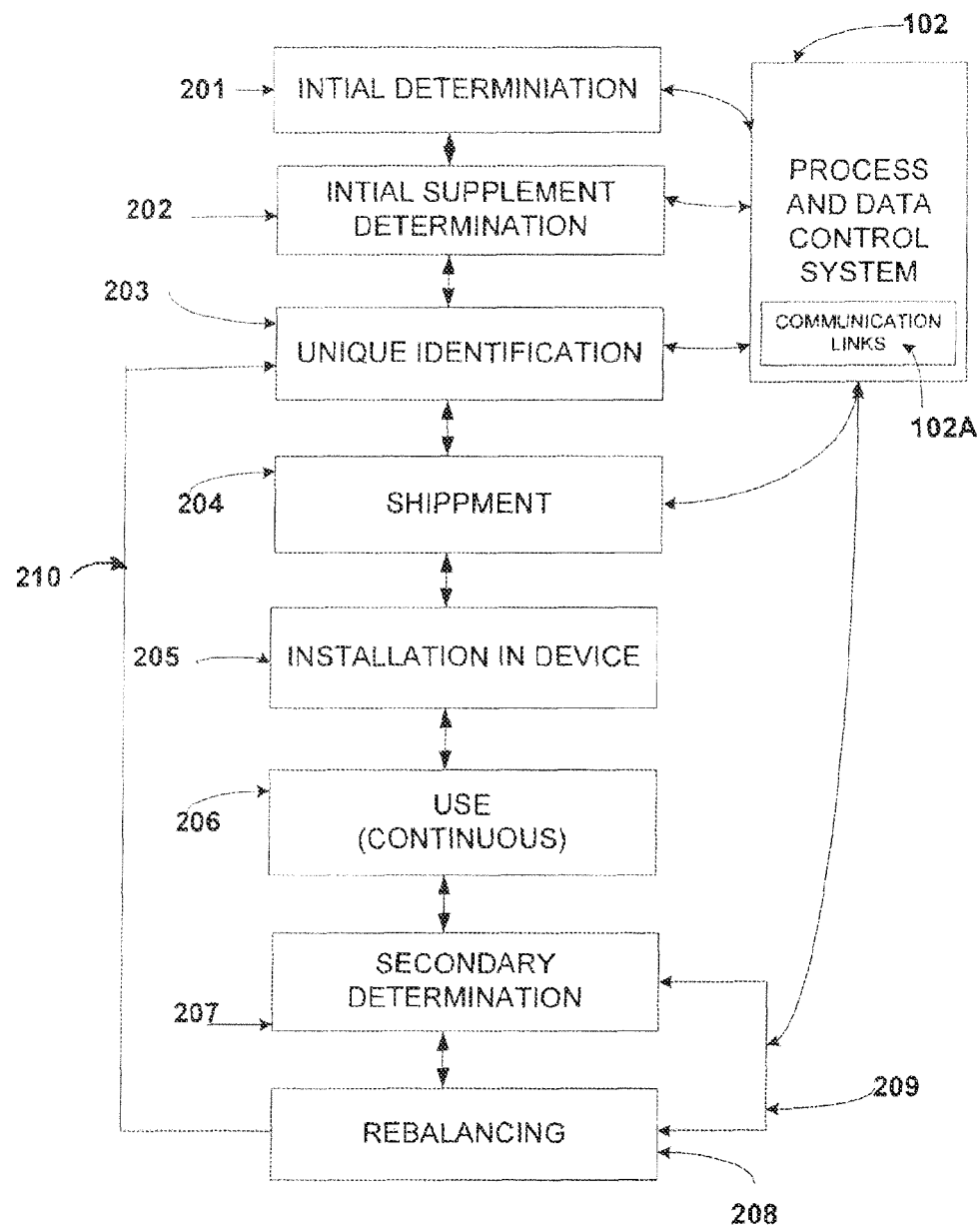
FIG. 2 is an illustrative flow chart of one alternative method according to one embodiment of the proposed invention.
Figure 3C:
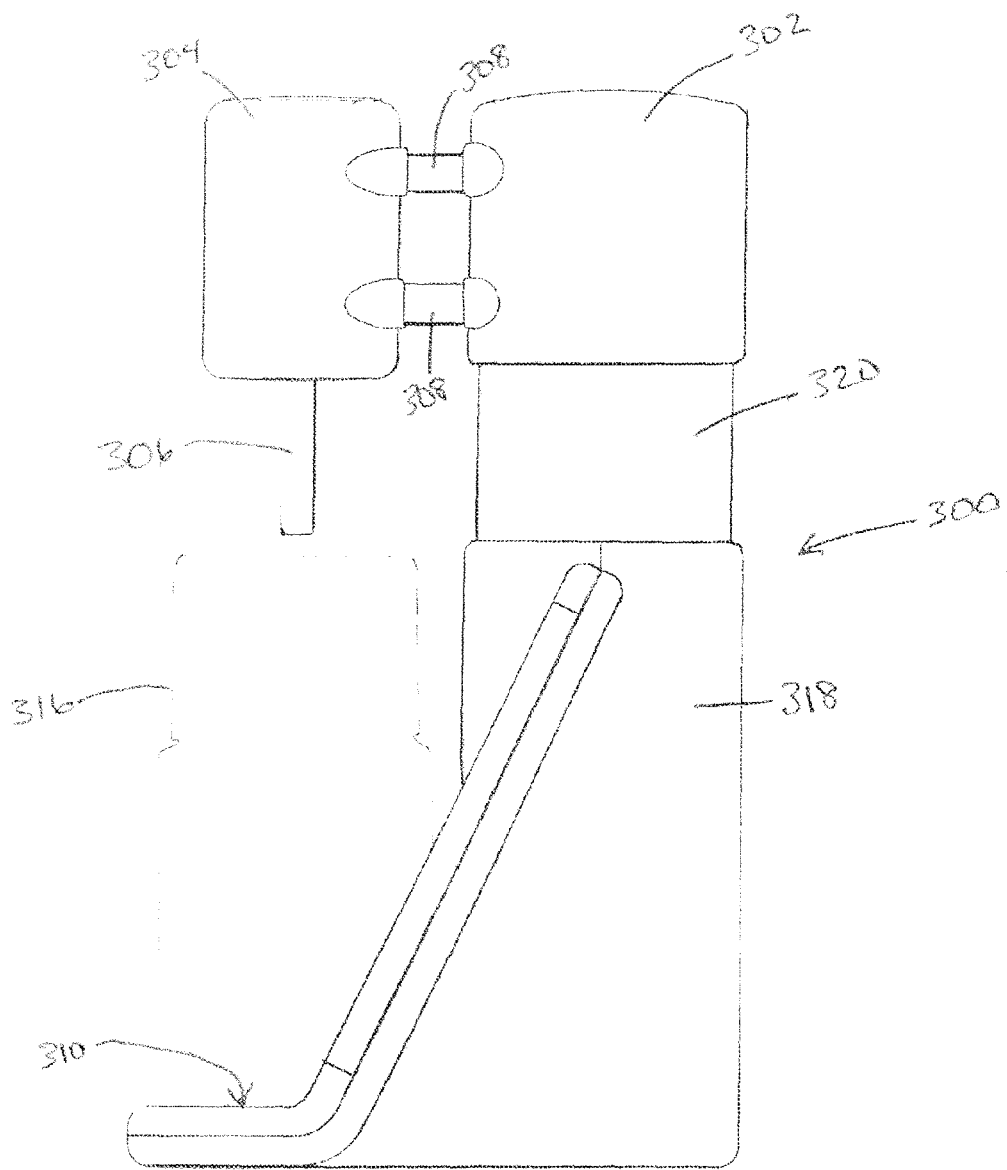
FIG. 3C is a side view of the mixing system shown in FIG. 3A.

Referring now to FIG. 2 wherein an operative and optional method of the proposed system is illustrated. In a first step 201 an initial determination is provided of user preferences and needs and includes (in each step noted hereafter) links with process and data control unit and system 102 containing operative communication links 102A. Such determination step may include questionnaires (multiple) following family history, health concerns, health history, desired outcomes (weight loss, muscle gain, medical treatment support (e.g., diabetes, wound healing, cancer treatment support, etc. without limitations thereto).

Following initial questionnaire and detail information for each individualized users an initial recommended user-unique supplement determination is made in a step 202 linked with a unique identification step 203 and via process and data control system 102, a supplement concentrate product is created, packaged, and shipped in a combined step 204 to a user for installation in a device 205. Device system 100 recognizes the unique identification and conducts local controls and monitoring as discussed elsewhere through continuous use steps 206 for a designated period of time (user determined, medically determined etc.) until a desire to conduct a secondary determination step 207 is reached.

In step 207 a link with the unique identification is made via path 210 to process control 102 and the historic data is stored in data tables therewith. Additional steps in a rebalancing step 208 are conducted that would include modifying the initial supplement determination step 202 and crafting a replacement or secondary supplement via a path 209 shown also linked with process control 102. In this matter, during a rebalancing step a new individually identifiable supplement is packaged, shipped, delivered, linked with the system and dispensed therefrom.

It will be recognized that this process of initial determination and later rebalancing may be repeated without limit so as to provide a continual trainable process unique to each user's needs.

Further, it will be understood that the entire contents of the incorporated-by-reference U.S. Pat. No. 7,762,181 is available to access for enabling content upon question by one of skill in the art. Additionally, it will be understood that this application will incorporate the currently known highest skill in the communication, data management, shipping, user-identification and product-identification technologies in the art. Thus, for a non-limiting example where data is *sent" or 'recorded' this will be understood to incorporate all known ways (wired, wireless, encrypted, open, random-access memory, bubble-memory, cloud-based etc.). For example, the current process control system and data tables could be cloud-based, or located on a proprietary enterprise type system with server modules. Finally, it will be understood that the full health, medical, vitamin, pharmaceutical, and nutrition data available and is used to guide supplement or concentrate and dilutant determination.

It will be understood that the phrase dilutant supply or dilutant may be any fluid material that is not the nutraceutical concentration, thereby allowing a dilution of the concentration during a use dispensment. The dilutant may be any suitable fluid for human consumption, and by way of non-limiting example the dilutant may be water or another combination of components (e.g., coffee, tea, milk, pharmaceutical combinations etc., without limitation).

It will be understood that the phrase nutraceutical, indicates a portmanteau of the words "nutrition" and "pharmaceutical", and as used herein is a food or food product that reportedly provides health and medical benefits, including the prevention and treatment of disease, and that this food or food product may be of any kind, but is preferably in the form of a fluid concentrate intended for combination with water prior to ingestion by an end user. Nothing herein will limit the interpretation to requiring a pharmaceutical product. It will also be understood that nutraceutical may additionally include those compounds, vitamins, flavorings, minerals, drugs, or pharmaceutical compositions (without limit to any) that are believed to have a physiological benefit or provide protection against chronic disease. With recent developments in cellular-level nutraceutical agents the proposed use will be understood as non-limiting and is to be broadly interpreted to include any complementary and alternative therapies now known or later developed.

Figure 4A:
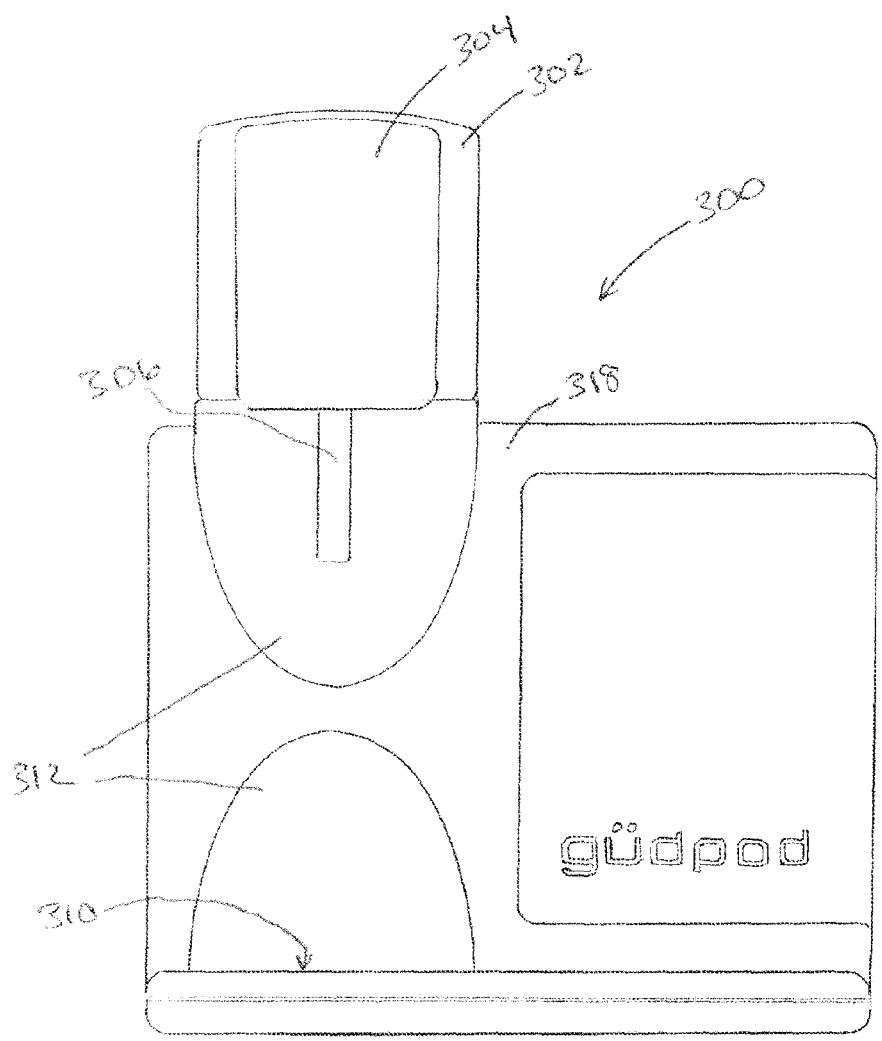
FIG. 4A is a front plan view of the portable mixing system shown in FIG. 3A with the system in the lowered or closed position.
Figure 4B:
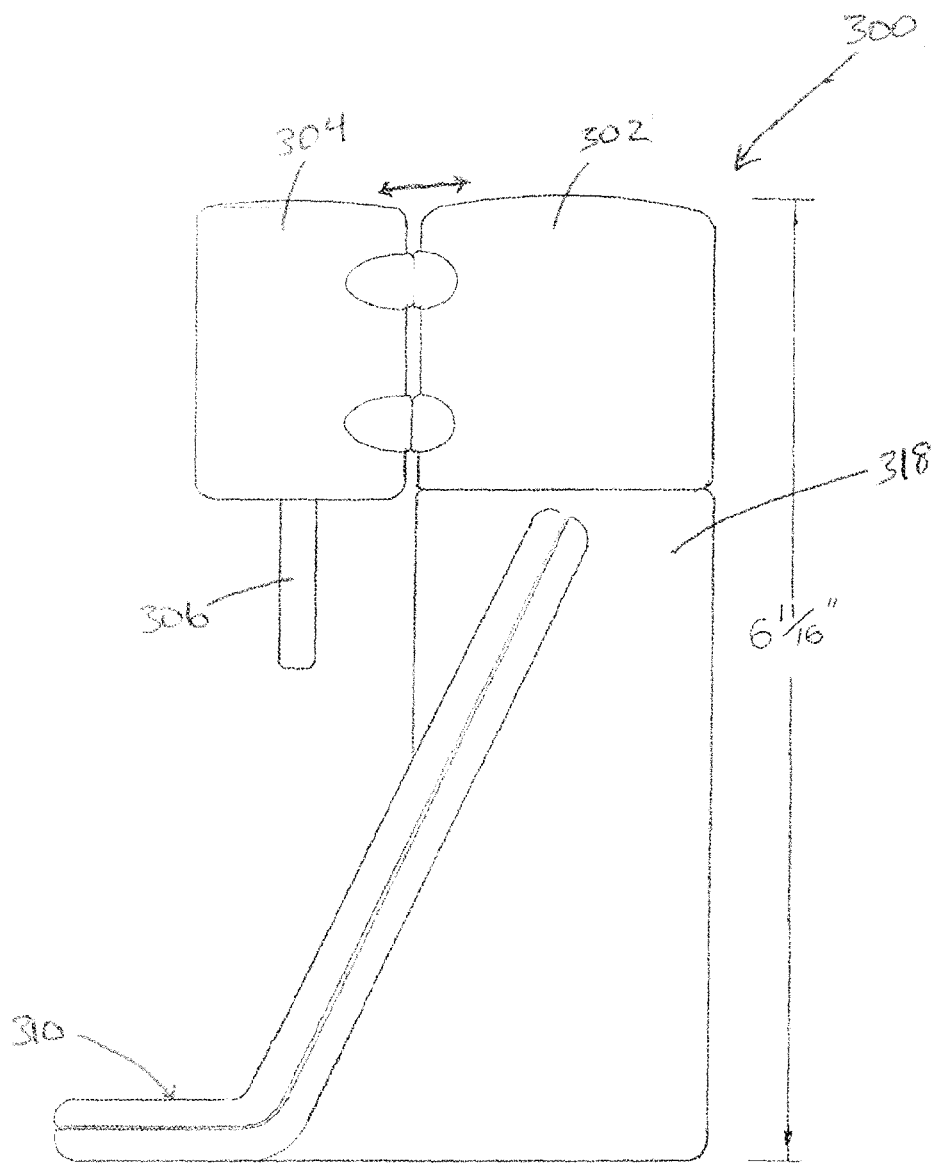
FIG. 4B is a side view of the mixing system shown in FIG. 4A.

Turning next to FIGS. 3A-C and 4A-4B, shown are the portable mixing system with safety controls according to the preferred embodiment of the present invention with the system in the raised or open position (FIGS. 3A-C) and in the lowered or closed position (FIGS. 4A-B). Preferably, the system comprises a housing body 318 having a pod or container receiving portion 312 with a slip resistant bottom surface 310. Alternatively, bottom surface 310 may be a type of key-in surface to lock or otherwise secure the pod or container 316 in place during operation. The preferred pods or containers 316 for use with the invention will be discussed in greater detail below. Optionally, the mixing system 300 may have safety controls 314 to alert the user to a particular speed or frequency of the mixing based upon the type of nutraceutical being used or the size or amount being used. Mixing system 300 further comprises movable mixing head 320 comprising back head 302 movably connected to front mixing head 304 which includes stirrer or mixer 306.

During operation, after pod or container 316 is positioned securely on surface 310, mixing head 320 is lowered (see FIGS. 4A-B) such that mixer or stirrer 306 is inserted into the contents of the pod or container 316. The user then selects the appropriate control 314 for the desired frequency or speed of the mixing. Optionally, front mixing head, which is connected to back head 302 via movable arms 308 such that mixing arm 306 moves about within pod or container 316. Similarly, the mixing head 320 may also optionally partially rotate (e.g., approximately 45% or 60%) again to move mixing arm 306 around within container or pod 316.

Preferably, internal (not shown) to the mixing system 300 is an internal process controller unit (including suitable memory and processing units) optionally linked with an external communication control system. As will be understood by those of skill in the system operational arts, during any use, system 300 may be able to track individual uses, dispensements, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 300 may be able to re-order, and operate commercial transactions on behalf of a user based upon designated user preferences.

Figure 5C:
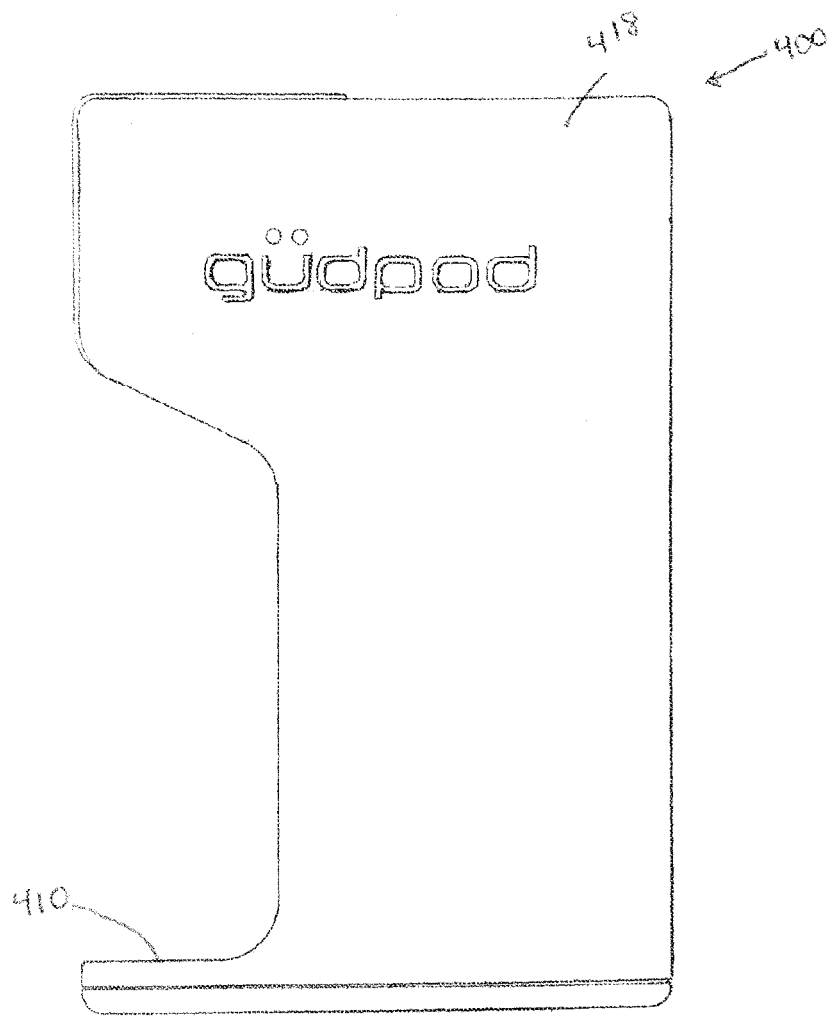
FIG. 5C is a side view of the mixing system shown in FIG. 5A.

Referring next to FIGS. 5A-C, shown is the portable mixing system with safety controls according to an alternate embodiment of the present invention. Preferably, the system comprises a housing body 418 having a pod or container receiving portion 412 with a slip resistant bottom surface 410. Alternatively, bottom surface 410 may be a type of key-in surface to lock or otherwise secure the pod or container in place during operation. The preferred pods or containers for use with the invention will be discussed in greater detail below. Optionally, the mixing system 400 may have power control switch 422 and safety controls 414 (e.g., one for mom, one for dad, and one for child) to identify for or alert the user to a particular speed or frequency of the mixing based upon the type of nutraceutical or other health product being used or the size or amount being used. Optionally, a user access code, fingerprint scan, retina scan or other known type of safety control mechanisms that are difficult to bypass, including software safety control, may be employed with the system, especially for the consumption of quantity-sensitive materials (i.e., Iron, etc.) to prevent accidental overdose. Mixing system 400 further comprises movable mixing head 420 movably connected within housing 418 and is connected on its bottom surface to stirrer or mixing arm 406.

During operation, after a pod or container is positioned securely on surface 410, mixing head 420 is lowered such that mixing arm or stirrer 406 is inserted into the contents of the pod or container. The user then selects the appropriate control 414 for the desired frequency or speed of the mixing. As will be discussed further below, the mixing arm 406 may optionally have fans or blades which extend radially from mixing arm 406 to aid in the mixing process. Optionally, the mixing head 420 may also move up and down as well as partially rotate within housing 418 (e.g., approximately 45% or 60%) again to move mixing arm 406 around within the container or pod.

As discussed above, internal (not shown) to the mixing system 400 is preferably an internal process controller unit (including suitable memory and processing units) optionally linked with an external communication control system. In addition, a barcode reader or scanner 404 may be included to read and transmit information from the product being used to the internal process controller unit. As will be understood by those of skill in the system operational arts, during any use, system 400 may be able to track individual uses, dispensements, particular mixing proportions, total supplement delivery and other operations. Additionally, in an optional embodiment, the communication control system may be able to communicate externally to process control system and data tables and with the delivery supply system, thereby permitting comprehensive benefit, use, and adaptation tracking for a user's health benefit. Additionally, system 400 may be able to re-order, and operate commercial transactions on behalf of a user based upon designated user preferences.

Figure 6A:
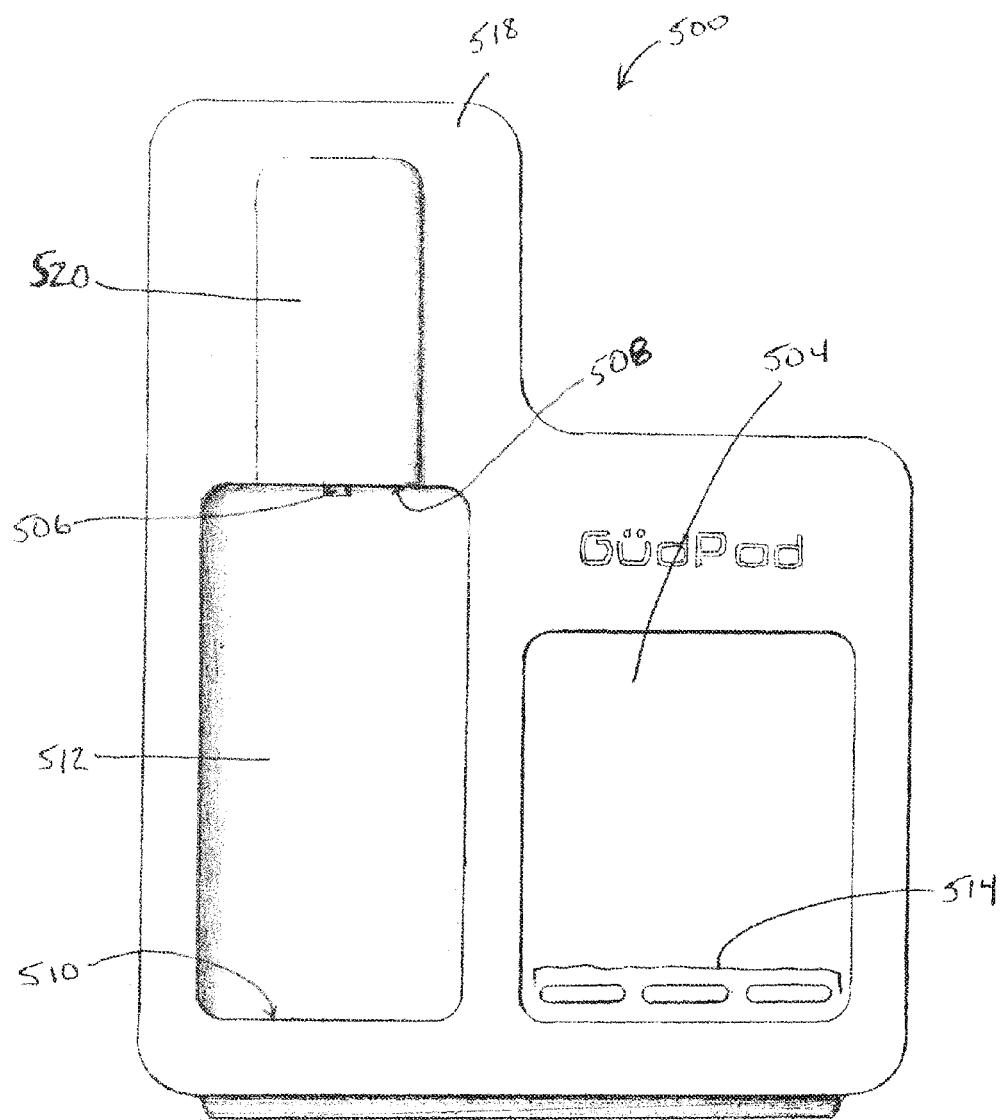
FIG. 6A is a front plan view of the portable mixing system with safety controls according to another alternate embodiment of the present invention.
Figure 6B:
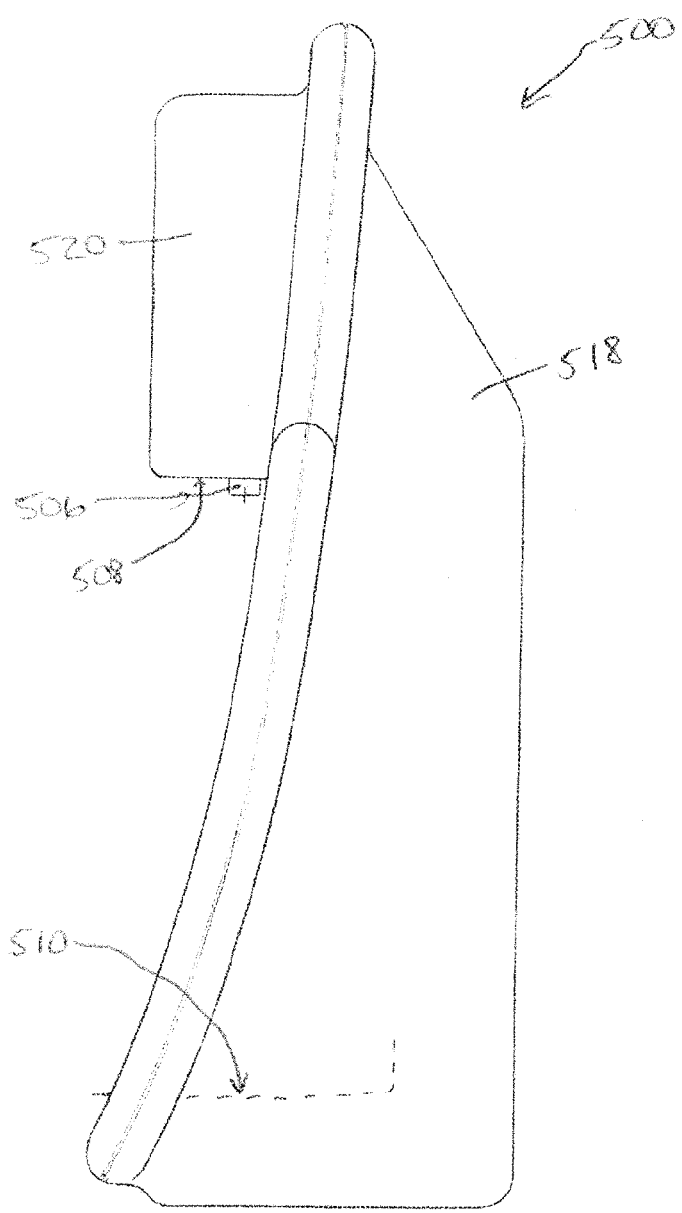
FIG. 6B is a side view of the mixing system shown in FIG. 6A.

Turning next to FIGS. 6A-B, shown is the portable mixing system 500 with safety controls according to yet another alternate embodiment of the present invention. Preferably, the system comprises a housing body 518 having a pod or container receiving portion 512 with a slip resistant bottom surface 510. Alternatively, bottom surface 510 may be a type of key-in surface to lock or otherwise secure the pod or container in place during operation. The preferred pods or containers for use with the invention will be discussed in greater detail below. Optionally, the mixing system 500 may have a power control switch and safety controls 514 (e.g., one for mom, one for dad, and one for child) to identify for or alert the user to a particular speed or frequency of the mixing based upon the type of nutraceutical or other health product being used or the size or amount being used. Alternatively, an LED or other touch based electronic screen 504 may be employed to provide all the control menus and options for the user of the system. Mixing system 500 further comprises mixing head 520 connected to housing 518 directly above container receiving portion 512 and is connected to stirrer or mixing arm 506.

During operation, after a pod or container is positioned securely on surface 510, mixing head 520 lowers mixing arm or stirrer 506 into the contents of the pod or container. The user then selects the appropriate control 514 (or using other control pad 504) for the desired frequency or speed of the mixing. As will be discussed further below, the mixing arm 506 may optionally have fans or blades which extend radially from mixing arm 506 to aid in the mixing process. Optionally, the mixing head 520 may also move up and down as well as partially rotate within housing 518 (e.g., approximately 45% or 60%) again to move mixing arm 506 around within the container or pod.

As discussed above with the other embodiments, internal (not shown) to the mixing system 500 is preferably an internal process controller unit (including suitable memory and processing units) optionally linked with an external communication control system. In addition, a barcode reader or scanner 508 may be included to read and transmit information from the product being used to the internal process controller unit. As will be understood by those of skill in the system operational arts, during any use, system 500 may be able to track individual uses, dispensements, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 500 may be able to re-order, and operate commercial transactions on behalf of a user based upon designated user preferences.

Figure 7A:
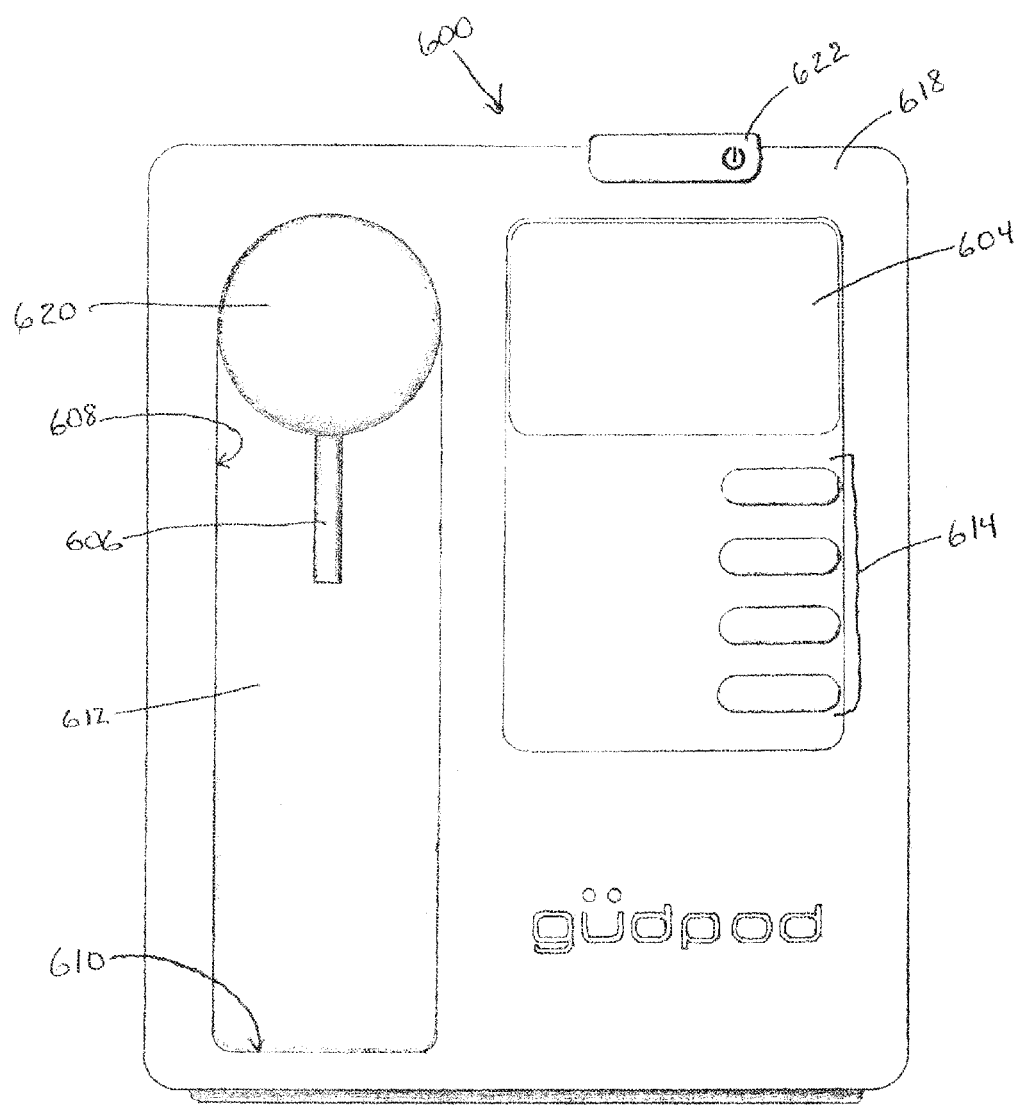
FIG. 7A is a front plan view of the portable mixing system with safety controls according to another alternate embodiment of the present invention.
Figure 7B:
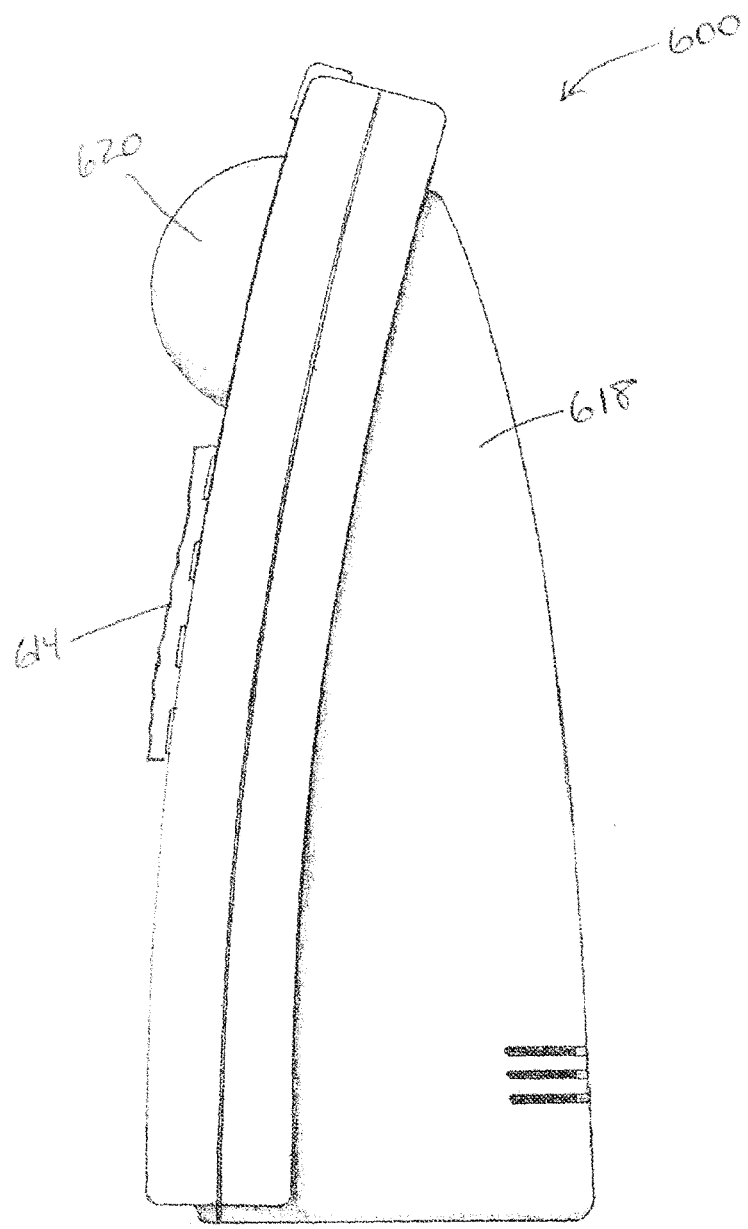
FIG. 7B is a side view of the mixing system shown in FIG. 7A.

Turning next to FIGS. 7A-B, shown is the portable mixing system 600 with safety controls according to still yet another alternate embodiment of the present invention. Preferably, the system comprises a housing body 618 having a pod or container receiving portion 612 with a slip resistant bottom surface 610. Alternatively, bottom surface 610 may be a type of key-in surface to lock or otherwise secure the pod or container in place during operation. The preferred pods or containers for use with the invention will be discussed in greater detail below. Optionally, the mixing system 600 may have a power control switch 622 and safety controls 614 (e.g., one for mom, one for dad, and one for child) to identify for or alert the user to a particular speed or frequency of the mixing based upon the type of nutraceutical or other health product being used or the size or amount being used. Alternatively, an LED or other touch based electronic screen 604 may be employed to provide all the control menus and options for the user of the system. Mixing system 600 further comprises mixing head 620, in this embodiment a ball-shaped head, connected to housing 618 directly above container receiving portion 612 and is connected to stirrer or mixing arm 606.

Again, during operation, after a pod or container is positioned securely on surface 610, mixing head 620 lowers mixing arm or stirrer 606 into the contents of the pod or container. The user then selects the appropriate control 614 (or using other control pad 604) for the desired frequency or speed of the mixing. Mixing system 600 may optionally employ a locking mechanism or child safety lock to prevent a child from accidentally selecting an adult size or speed. As will be discussed further below, the mixing arm 606 may optionally have fans or blades which extend radially from mixing arm 606 to aid in the mixing process. Optionally, the mixing head 620 may also move up and down as well as partially rotate within housing 618 (e.g., approximately 45% or 60%) again to move mixing arm 606 around within the container or pod.

As discussed above with the other embodiments, internal (not shown) to the mixing system 600 is preferably an internal process controller unit (including suitable memory and processing units) optionally linked with an external communication control system. In addition, a barcode reader or scanner 508 may be included to read and transmit information from the product being used to the internal process controller unit. As will be understood by those of skill in the system operational arts, during any use, system 600 may be able to track individual uses, dispensations, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 600 may be able to re-order, and operate commercial transactions on behalf of a user based upon designated user preferences.

Figure 8A:
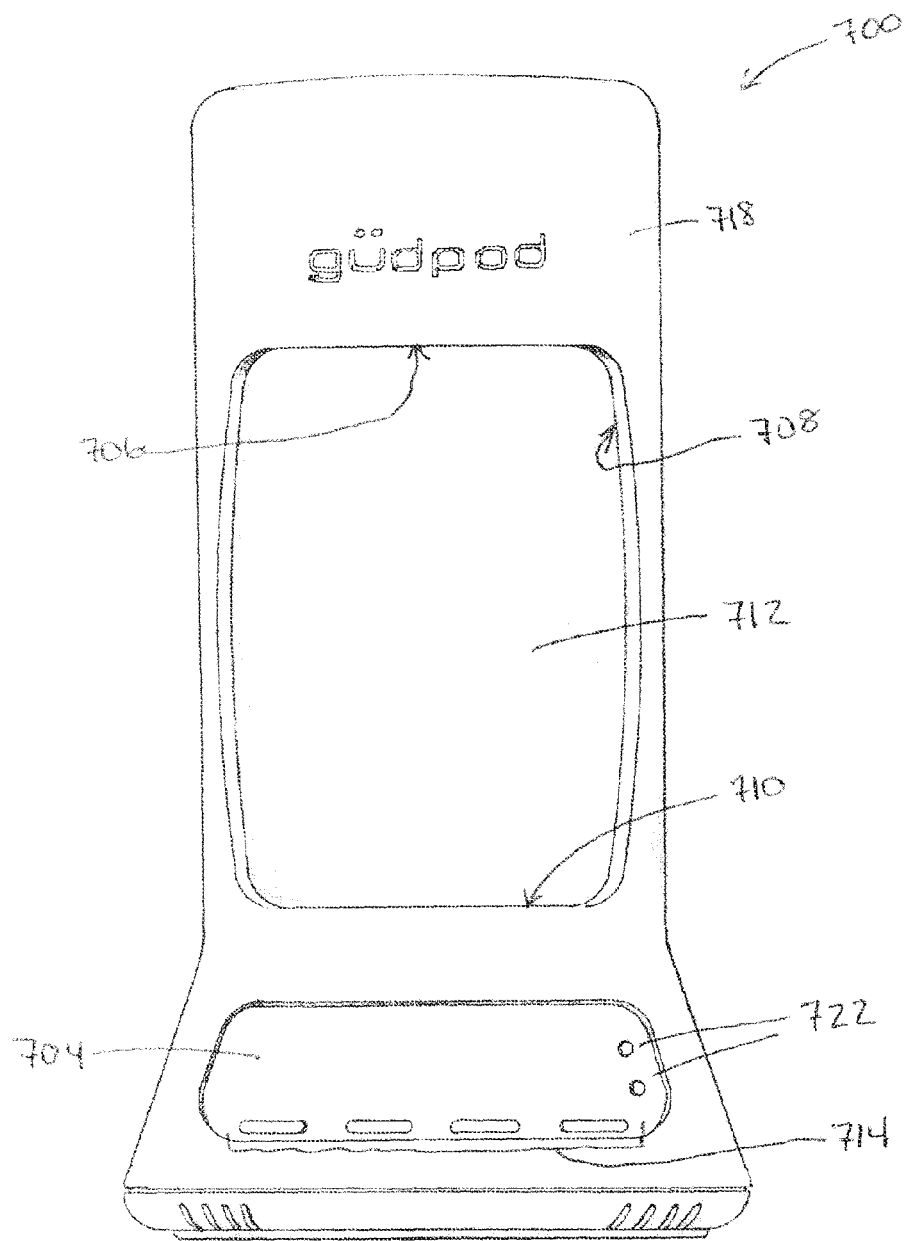
FIG. 8A is a front plan view of the portable mixing system with safety controls according to another alternate embodiment of the present invention.
Figure 8B:
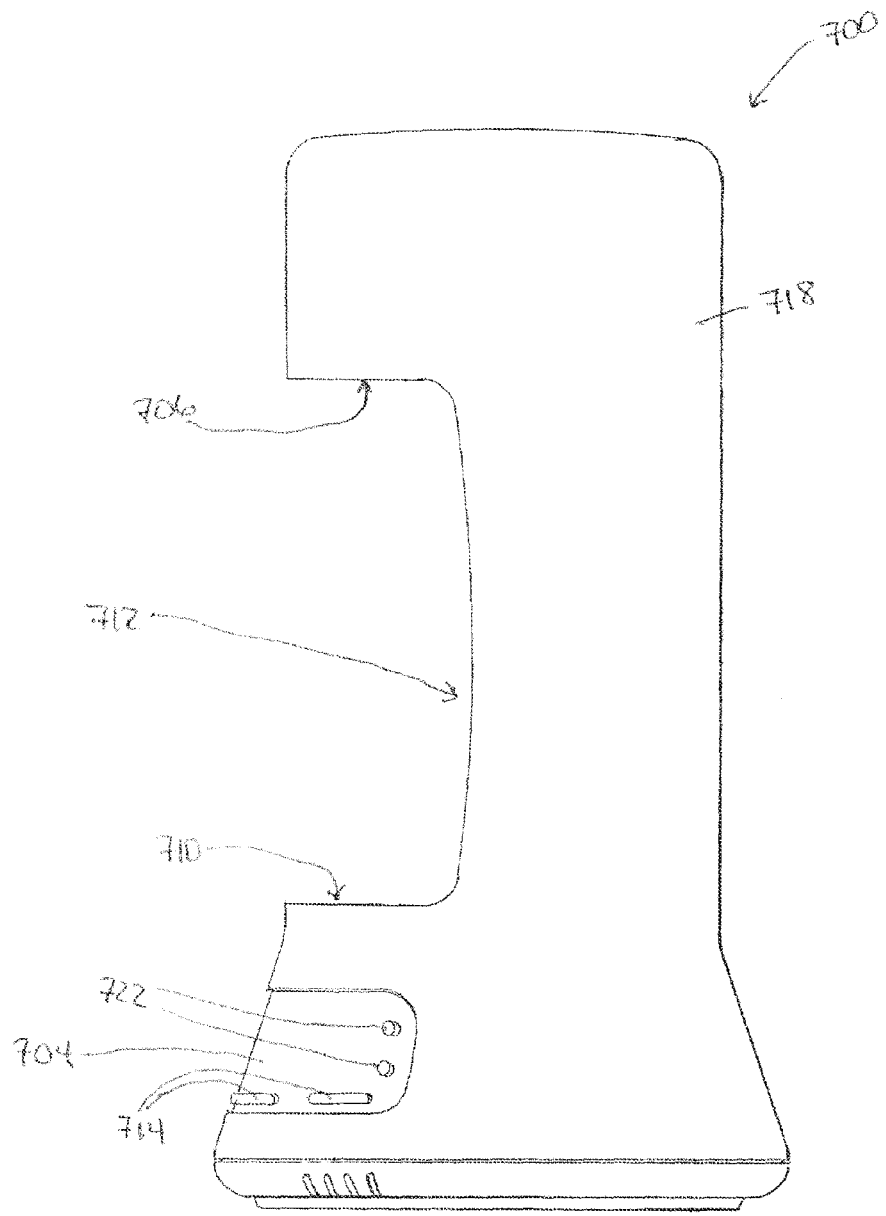
FIG. 8B is a side view of the mixing system shown in FIG. 8A.

Referring now to FIGS. 8A-B, shown is the portable mixing system 700 with safety controls according to still another alternate embodiment of the present invention. Preferably, the system comprises a housing body 718 having a pod or container receiving portion 712 with a slip resistant bottom surface 710. Alternatively, bottom surface 710 may be a type of key-in surface to lock or otherwise secure the pod or container in place during operation. The preferred pods or containers for use with the invention will be discussed in greater detail below. Optionally, the mixing system 700 may have a power control switches 722 and safety controls 714 (e.g., one for mom, one for dad, and one for child) to identify for or alert the user to a particular speed or frequency of the mixing based upon the type of nutraceutical or other health product being used or the size or amount being used. Alternatively, an LED or other touch based electronic screen 704 may be employed to provide all the control menus and options for the user of the system. Mixing system 700 further comprises a mixing head (not seen) within the upper portion of housing 718 connected to directly above container receiving portion 712 and which is connected to or integral with stirrer or mixing arm 706 (also not seen).

During operation, after a pod or container is positioned securely on surface 710, mixing head lowers mixing arm or stirrer 706 into the contents of the pod or container. The user then selects the appropriate control 714 (or using other control pad 704) for the desired frequency or speed of the mixing. Mixing system 700 may optionally employ a locking mechanism or child safety lock to prevent a child from accidentally selecting an adult size or speed. As will be discussed further below, the mixing arm 706 may optionally have fans or blades which extend radially from mixing arm 706 to aid in the mixing process. Optionally, the mixing head may also move up and down as well as partially rotate within housing 718 (e.g., approximately 45%, 60%, 75%, etc.) again to move mixing arm 706 around within the container or pod.

As discussed above with the other embodiments, internal (not shown) to the mixing system 700 is preferably an internal process controller unit (including suitable memory and processing units) optionally linked with an external communication control system. In addition, a barcode reader or scanner 708 may be included to read and transmit information from the product being used to the internal process controller unit. As will be understood by those of skill in the system operational arts, during any use, system 700 may be able to track individual uses, dispensations, particular mixing proportions, total supplement delivery and other operations. Additionally, in an optional embodiment, the communication control system may be able to communicate externally to process control system and data tables and with delivery supply system, thereby permitting comprehensive benefit, use, and adaptation tracking for a user's health benefit. Additionally, system 700 may be able to re-order, and operate commercial transactions on behalf of a user based upon designated user preferences.

Turning our attention now to FIGS. 9 through 19, shown are various embodiment for pods or containers and some of their components that may be employed with the various mixing systems discussed above with respect to FIGS. 3 through 8. Referring first to FIGS. 9A-9D, show is a first embodiment of a pod or container 800 for use with the mixing systems previously described, illustrating a two part pod 800 (802, 804), a nutritional supplement part 810 and a housing part 804 for containing filtered water 814, with a mixing paddle 806 having radially projecting blades or fans and a upwardly projecting stem 808 for interfacing with the disclosed mixing systems. The nutritional supplement or vitamin supplement contained within nutritional supplement part 810 for any of the embodiments disclosed herein may be in the form of powder, liquid, dissolvable capsules or tablets, microcapsules, or other known form.

Preferably, upper part 810 of pod 800 has a sealing cap 802 having a sealing membrane or protective label 816 there on. Optionally, protective label 816 contains a 2D or 3D barcode thereon as seen in FIG. 9D for the mixing system to read, store and/or transmit information about the product being used. Also optionally, lid or cap 802 is secured onto an upper portion of housing part 804 in a tamper resistant manner such that if the seal is broken the average user would notice. Any of the known tamper resistant mechanisms for bottles or containers may be employed.

During operation, once pod or container 800 is positioned securely into the mixing system, a mixing head lowers will lower the mixing arm or stirrer down onto the upper portion or protective label 816 of pod or container 800. The mixing system will continue to move mixing arm downward until the lower end of the mixing arm connects or otherwise engages with the upper end of stem 808 of paddle 806 such that when mixing arm spins, paddle 806 will rotate at the same speed and/or frequency. Mixing arm continues to apply downward pressure on stem 808 until a lower tip 807 of paddle 806 punctures sealing membrane 812 which had been maintaining nutritional supplement or vitamin 810 away from water 814. Once sealing membrane 812 is punctured nutritional supplement or vitamin 810 spills into water 814 and mixing arm continue to apply downward pressure on stem 808 until paddle 806 is sufficiently submerged to a distance within water 814 to adequately and completely mix the water and nutritional supplement as described above with respect to any of the mixing systems disclosed herein. Once sufficiently mixed, the mixing arm rises out from within container 800 so that container 800 may be removed from the mixing system. Optionally, mixing arm (see any of FIGS. 3 through 8) and/or stem 808 may comprise a mechanism or may be configured in such a way that they become securely engaged and that when the mixing arm is removed from container 800, it removes paddle 806 as well. Optionally, paddle may remain with container and be disposed of along with container once all the liquid mixture is gone.

Figure 10:
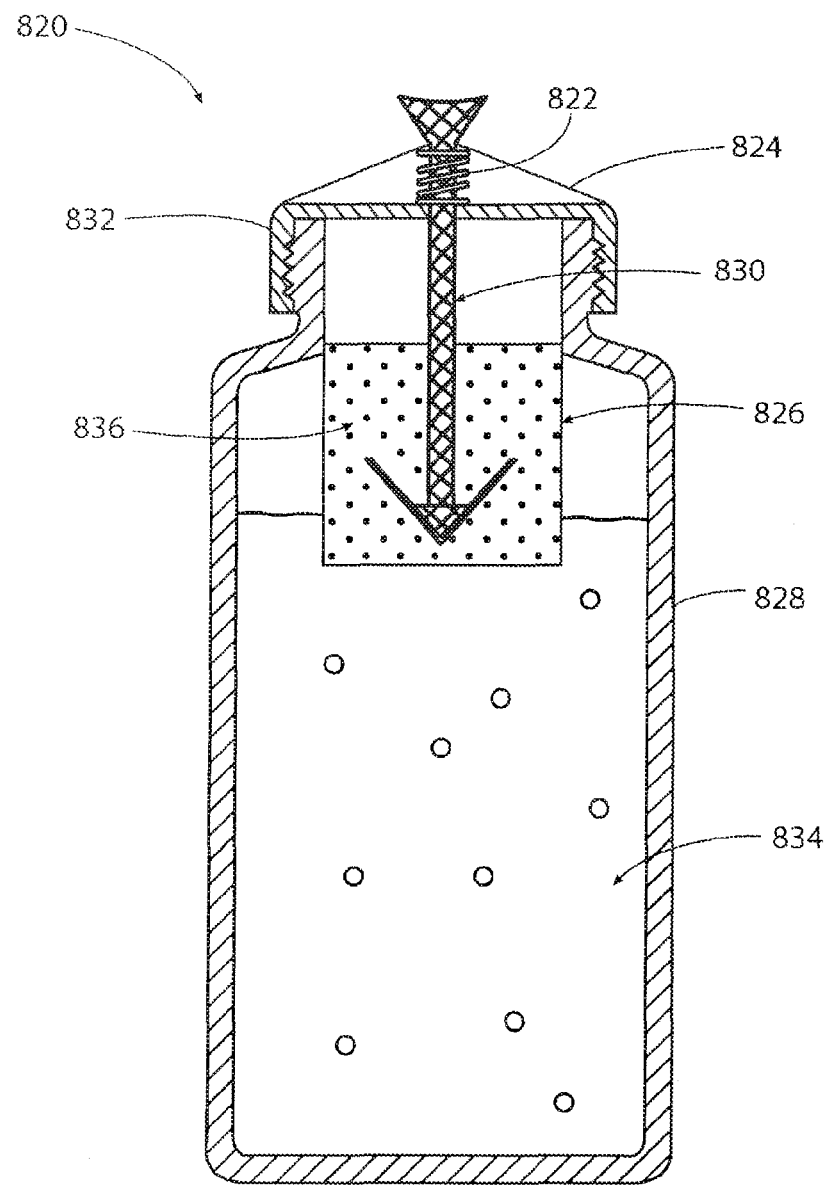
FIG. 10 is an exposed cross-sectional view of an alternative embodiment for a two part pod for use with the mixing system according to the invention.

Turning next to FIG. 10, shown is an exposed cross-sectional view of an alternative embodiment for a two part pod or container 820 for use with the mixing systems in accordance with the invention. In this embodiment, two part pod or container 820 comprises outer container 828 housing liquid (e.g., 3 or 4 ounces of water) and inner container or baggie 826 housing the nutritional supplement blend or vitamins 836. Inner container 826 is preferably heat-sealed on its upper end to the upper end of outer container 828. Outer container 828 may preferably be a blow molded polyurethane (PE) bottle or any other suitable container material for foods. An injection molded PE cap 832 is preferably affixed on the outer side of upper end of outer container 828 and includes an injection molded lance 830 through it top surface such that lance 830 has a lowere bladed end within baggie 826 and an upper end extending outwardly through cap 832. Adjacent the outer top side of cap 832 is preferably positioned a compression spring 822 which is surrounded by a film 824 heat sealed to cap and covering spring 822. Compression spring 822 is configured such that it maintains lance 830 in position until a downward force is applied during use.

As previously discussed, during operation, once pod or container 820 is positioned securely into the mixing system, a mixing head will lower the mixing arm or stirrer down onto the upper portion directly above spring 22 pod or container 820. The mixing system will continue to move its mixing arm downward until the lower end of the mixing arm connects or otherwise engages with the upper end of lance 830. The mixing arm continues to apply downward pressure on upper end of lance 830 until a lower tip of lance 830 punctures the lower end of baggie 826. Once broken, nutritional supplement or vitamin 836 spills into water 834 and mixing arm continue to apply downward pressure on lance 830 until sufficiently submerged to a distance within water 834 to adequately and completely mix the water and nutritional supplement as described above with respect to any of the mixing systems disclosed herein. Once sufficiently mixed, the mixing arm rises out from within container 820 so that container 820 may be removed from the mixing system. Optionally, mixing arm (see any of FIGS. 3 through 8) and/or lance 830 may comprise a mechanism or may be configured in such a way that they become securely engaged and that when the mixing arm is removed from container 820, it removes lance 830 as well. Optionally, lance 830 may remain with container and be disposed of along with container once all the liquid mixture is gone.

Figure 11B:
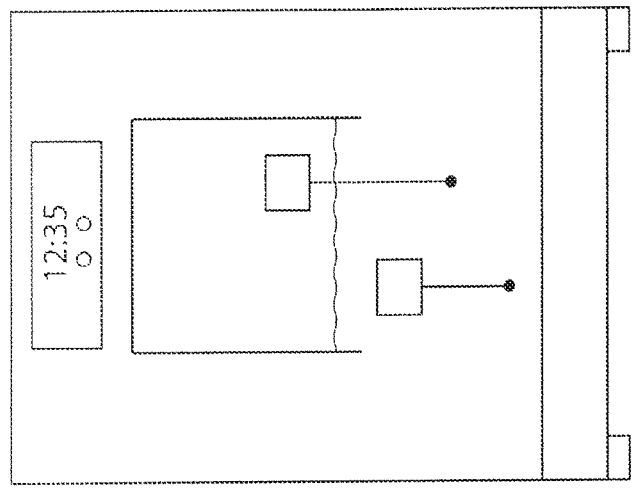
FIG. 11B is a descriptive illustration of phase two of a bi-pod filtration process used with the system according to one aspect of the invention.
Figure 11A:
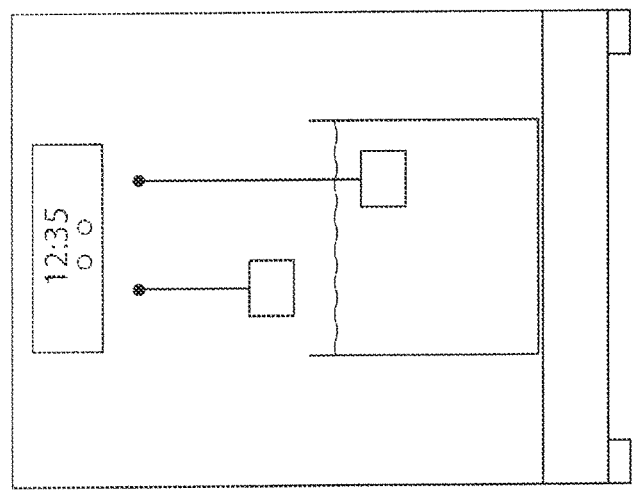
FIG. 11A is a descriptive illustration of phase one of a bi-pod filtration process used with the system according to one aspect of the invention.

Referring next to FIGS. 11A-B, shown are descriptive illustration of phase one and phase two of a bi-pod filtration process used with the system according to one aspect of the invention.

Looking now at FIG. 12, shown is an exploded perspective view of another alternative embodiment for a two part spin pod for use with the mixing system in accordance with the invention. As shown, two part pod 840 comprises housing or container 848 for hold liquid, and stir pod 845 comprising upper shaft 842 (preferably of a hex shape or some other shape such that secure interface may be made with the lower end of a mixing arm), side portions 844 and mixing paddle 846. During operation, once pod or container 840 is positioned securely into the mixing system, a mixing head will lower the mixing arm or stirrer down onto the upper portion directly above and engages upper shaft 842 without applying too much pressure. The mixing system will then begin rotation of the mixing arm thereby rotating stir pod 845.

Depicted in FIGS. 13 through 15 are alternative embodiments for the stir pod used in conjunction with the spin pod 840 shown in FIG. 12. For example, FIGS. 13A-B shows stir pod 850 in its closed (FIG. 13A) and its open (FIG. 13B) positions. During use, the centrifugal force from rotation of stir pod 850 from engaging the mixing arm of one of the above described mixing systems generates sufficient centrifugal force to open blades 852 thereby spilling the nutritional supplement blend therefrom and into the liquid in the container below. Blades 852 are then used to mix the water and nutritional supplement. Similarly, FIGS. 14A-C shows stir pods 854, 860 (stir pod 860 only having two blades) in closed (FIG. 14A) and open (FIG. 14B-C) positions. During use, pressure applied to tabs 856 during rotation of stir pods 854, 860 open blades 858, 862 thereby spilling the nutritional supplement blend therefrom and into the liquid in the container below. Blades 858, 862 are then used to mix the water and nutritional supplement. Looking at FIGS. 15A-B shown is another alternate embodiment for a stir pod for use with the invention. That is, stir pod 864 comprises veins or inwardly opening blades 866 such that with rotation thereof water flows into the stir pod 864 and out through an opening 868 on a bottom end of stir pod 864. During use, the centrifugal force from rotation of stir pod 884 from engaging the mixing arm of one of the above described mixing systems generates sufficient force to open blades 866 inwardly or allow water to break through a seal of some kind to mix with the nutritional supplement within stir pod 864 and flow out through its bottom thereby spilling the combined water-nutritional supplement blend from the stir pod 864. Briefly, FIG. 16 shows a perspective view of one embodiment of how any of the spinning pods may be packaged for proper sealing and safe handling.

As an alternative embodiment to the portable electronic mixing systems disclosed above, shown in FIGS. 17A-C, 18A-C and 19 describe various embodiments for a portable and disposable two part pod mixing system in accordance with the invention.

Referring first to FIGS. 17A-D, shown is a first embodiment of a pod or container 900. As illustrated, mixing container 900 preferably comprises a blow molded (P.P. or PET) housing 904, which is heat sealed on its lower end 906 with a PP or foil membrane to a blow molded PP lower compressible container 910. Preferably, housing 904 contains liquid (i.e., approximately 3 ounces of water) while lower collapsible container 910 contains the desired nutritional supplement. On its upper end, housing 904 is removably closed with a cap, such as the cap for an ordinary water bottle or soda bottle. Also optionally, lid or cap 902 is secured onto an upper portion of housing part 904 in a tamper resistant manner such that if the seal is broken the average user would notice. Any of the known tamper resistant mechanisms for bottles or containers may be employed. Of course, a larger lid configuration of container having a large lid such as container 901 may be used.

Also, within lower collapsible container 910 is positioned, preferably affixed to the bottom surface thereof, a foil or membrane piercing divider 914. Upon shaking or vigorous up and down motion of the container 900, piercing divider 914 punctures (912) foil or membrane 908 thereby allowing the nutritional supplement in lower container 910 to mix with the water in housing 904 upon continued shaking. Accordingly, while it is preferred that piercing divider 914 be configured as shown, i.e., in the shape of a pyramid, any shape divider which has a sharp enough apex would suffice.

Turning to FIGS. 18A-B, shown is a second embodiment of a two compartment mixing pod or container 9200. As illustrated, mixing container 920 here preferably comprises a blow molded (P.P. or PET) housing 904, which is heat sealed on its lower end with a PP or foil membrane to a blow molded PP lower compressible container 930. Preferably, housing 924 contains liquid (i.e., approximately 3 ounces of water) while lower collapsible container 930 contains the desired nutritional supplement. On its upper end, housing 924 is removably closed with a tamper resistant heat sealed pull off lid 922, such as the pull off lid for a container of yogurt.

Also, within lower collapsible container 930 is positioned, preferably affixed to the bottom surface thereof, a foil or membrane piercing divider 934. Upon shaking or vigorous up and down motion of the container 920, piercing divider 934 punctures the foil or membrane thereby allowing the nutritional supplement in lower container 930 to mix with the water in housing 924 upon continued shaking. Accordingly, while it is preferred that piercing divider 914 be configured as shown, i.e., in the shape of a pyramid, any shape divider which has a sharp enough apex would suffice. Moreover, while two piercing dividers are shown, other numbers of dividers may be used with the invention.

As seen in FIG. 18C, yet another alternate embodiment of the two part mixing pod is shown. Here, pod 920 comprises on its lower end an expandable lower region 926 which on its lower end is heat sealed to lower collapsible compartment 928. In this embodiment, upon shaking or vigorous up and down motion of the container 920, a piercing divider, much like divider 934 seen in FIG. 18B punctures the foil or membrane thereby allowing the nutritional supplement in lower container 928 to mix with the water in housing 924 upon continued shaking. Preferably, upon puncture of the membrane, lower compartment 928 compresses or collapses while at the same time or close to the same time expanding region 926 of pod 920 expands to allow for extra space with housing 924 upon entry of the nutritional supplement.

Figure 19:
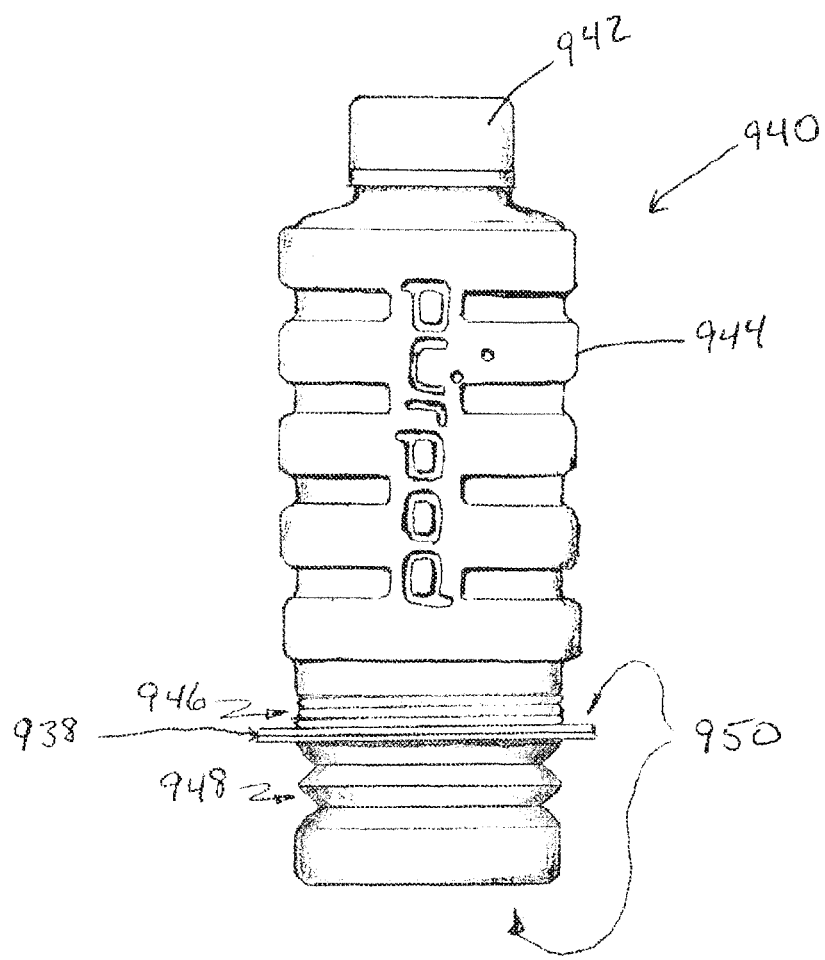
FIG. 19 is a front plan view of still another alternative embodiment for a two part pod or compartment for use with the mixing system in accordance with the invention; and Appendix A provides an illustrative summary of operative concepts of the proposed system and method, but the proposed system and method is not limited to the Appendix.

Similar to the embodiment just described with respect to FIG. 18C, yet another alternate embodiment of the two part mixing pod is shown in FIG. 19, which is similar to the two compartment pods shown in FIGS. 17A-B but with the added expandable region 946. Here, pod 940 comprises on its lower end an expandable lower region 946 which on its lower end is heat sealed 938 to lower collapsible compartment 948. In this embodiment, upon shaking or vigorous up and down motion of the container 940, a piercing divider, much like divider 934 seen in FIG. 18B, punctures the foil or membrane thereby allowing the nutritional supplement in lower container 948 to mix with the water in housing 944 upon continued shaking. Preferably, upon puncture of the membrane, lower compartment 948 compresses or collapses while at the same time or close to the same time expanding region 946 of pod 940 expands to allow for extra space within housing 944 for entry of the nutritional supplement. Alternatively, pod 940 may be held by a machine at 950. The machine would compress lower compartment 948, then shaking pod 940 such that expanding region 946 expands.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it will be apparent to those skilled in the art that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents. The scope of the invention, therefore, shall be defined solely by the following claims. It should be appreciated that the present invention is capable of being embodied in other forms without departing from its essential characteristics.

What is claimed is:

1. A beverage mixing system, comprising:
a housing body having a container receiving portion to support a bounded container containing a potable liquid;
a mixing arm coupled to the housing body to engage a mixing element of a pod that houses a nutraceutical composition, the mixing element including a paddle or a blade or a fan and an upwardly projecting stem that interfaces with the mixing arm; and
in response to the pod being positioned between the bounded container and the mixing arm, a controller unit to cause the mixing arm to engage a portion of the upwardly projecting stem of the mixing element inside of the pod and to urge the mixing element into the bounded container to cause at least some of the nutraceutical composition to be transferred from the pod into the bounded container, the controller unit thereupon causing the mixing element to agitate the nutraceutical composition and the potable liquid together in the bounded container.

2. The system of claim 1, further comprising a mixing head coupling the mixing arm to the housing body, the mixing head being operable to move up and down, wherein the mixing arm is at least partially rotated simultaneously or independently from upward or downward movement of the mixing head.

3. The system of claim 1, further comprising a mixing head coupled between the housing body and the mixing arm, the mixing head configured to lower the mixing arm until at least a lower end of the mixing arm engages the upwardly projecting stem.

4. The system of claim 3, wherein the mixing head raises the mixing arm following agitation of the nutraceutical composition to allow removal of the pod from the mixing system.

5. The system of claim 3, wherein the controller unit controls the beverage mixing system to at least partially rotate the mixing arm to cause the mixing element to at least partially rotate.

6. The system of claim 5, wherein the mixing arm is configured to securely engage the upwardly projecting stem such that the mixing element is removable with the pod following agitation of the nutraceutical composition.

7. The system of claim 6, the mixing arm further comprising a mechanism that securely engages the upwardly projecting stem.

8. The system of claim 1, wherein the pod is receivably retained at a position above an opening to the bounded container, the pod forming a second bounded container holding the nutraceutical composition until the mixing element is urged into the bounded container.

9. The system of claim 1, wherein the nutraceutical composition is a dry nutraceutical composition.

10. The system of claim 1, wherein the nutraceutical composition includes a pharmaceutical composition.

11. The system of claim 1, wherein the agitation of the nutraceutical composition includes any one or more of: varying or oscillating a depth of engagement between the mixing arm and the bounded container, or varying a duration of the agitation, or reversing a direction of rotation of the mixing element, or oscillating the mixing element, or moving the mixing arm around within the bounded container, or varying a frequency of the agitation, or varying a speed of the agitation.

12. The system of claim 11, wherein the oscillating includes a clockwise rotation of the mixing element followed or preceded by a counter-clockwise rotation of the mixing element.

13. The system of claim 11, wherein the varying or oscillating the depth of engagement includes moving the mixing arm up then down or down then up.

14. The system of claim 1, further comprising a reader operable to scan a code associated with the pod, the controller unit receiving identification or use information associated with the code scanned by the reader.

15. The system of claim 1, the beverage mixing system further including a movable back head that is operable to move up and down to cause the mixing element of the pod to be submerged a distance within the potable liquid in the bounded container.

16. The system of claim 1, wherein the mixing arm is securely engaged with the upwardly projecting stem of the mixing element so that responsive to the mixing arm being retracted from the bounded container, the mixing element is also thereby retracted simultaneously.

17. A beverage mixing system, comprising:
- a housing body having a container receiving portion to support a bounded container containing a potable liquid;
- a mixing arm coupled to the housing body to engage a mixing element of a pod that houses a nutraceutical composition; and
- in response to the pod being positioned between the bounded container and the mixing arm, a controller unit to cause the mixing arm to engage the mixing element of the pod and to urge the mixing element into the bounded container to cause at least some of the nutraceutical composition to be transferred from the pod into the bounded container, the controller unit thereupon causing the mixing element to agitate the nutraceutical composition and the potable liquid together in the bounded container,
- wherein the mixing arm is securely engaged with the mixing element so that responsive to the mixing arm being retracted from the bounded container, the mixing element is also thereby retracted simultaneously.

18. The system of claim 17, wherein the mixing element includes a paddle or a blade or a fan and an upwardly projecting stem that interfaces with the mixing arm.

19. The system of claim 17, wherein the mixing arm further comprises a mechanism that securely engages the mixing element, and wherein the controller unit controls the beverage mixing system to at least partially rotate the mixing arm to cause the mixing element to at least partially rotate.

20. A beverage mixing system, comprising:
- a housing body having a container receiving portion to support a bounded container containing a potable liquid;
- a mixing system having a mixing head that is operable to move up and down and a mixing arm coupled to the housing body via the mixing head to engage a mixing element of a pod that houses a nutraceutical composition, the mixing element including a plurality of radially projecting paddles or blades or fans and an upwardly projecting stem that securely engages the mixing arm so that responsive to the mixing arm being retracted from the bounded container, the mixing element is also thereby retracted simultaneously, the mixing arm being operable to at least partially rotate simultaneously or independently from movement of the mixing head, the pod being receivably retained at a position above an opening to the bounded container, the pod forming a second bounded container holding the nutraceutical composition until the mixing element is urged into the bounded container; and
- a controller unit to cause the mixing arm to engage a portion of the upwardly projecting stem of the mixing element inside of the pod and to urge the mixing element into the bounded container to cause at least some of the nutraceutical composition to be transferred from the pod into the bounded container, the controller unit thereupon causing the mixing element to agitate the nutraceutical composition and the potable liquid together in the bounded container, the agitation of the nutraceutical composition includes any one or more of varying or oscillating a depth of engagement between the mixing arm and the bounded container, or varying a duration of the agitation, or reversing a direction of rotation of the mixing element, or oscillating the mixing element, or moving the mixing arm around within the bounded container, or varying a frequency of the agitation, or varying a speed of the agitation.

21. The system of claim 20, wherein
- the mixing head is controlled to lower the mixing arm until at least a lower end of the mixing arm engages the upwardly projection stem,
- the mixing head is controlled to raise the mixing arm following agitation of the nutraceutical composition to allow removal of the pod from the beverage mixing system, and
- the controller unit controls the beverage mixing system to rotate the mixing arm to cause the mixing element to rotate.

* * * * *